United States Patent
Nicholas et al.

(10) Patent No.: US 11,583,918 B2
(45) Date of Patent: Feb. 21, 2023

(54) RIVET TAPE JOINING

(71) Applicant: Atlas Copco IAS UK Limited, Flintshire (GB)

(72) Inventors: Adam James Nicholas, Walled Lake, MI (US); Joshua Allan Jackson, Webberville, MI (US); Nicholas Richard Clew, Farmington Hills, MI (US)

(73) Assignee: Atlas Copco IAS UK Limited, Flintshire (GB)

( * ) Notice: Subject to any disclaimer, the term of this patent is extended or adjusted under 35 U.S.C. 154(b) by 139 days.

(21) Appl. No.: 16/462,283

(22) PCT Filed: Mar. 29, 2018

(86) PCT No.: PCT/GB2018/050883
§ 371 (c)(1),
(2) Date: May 20, 2019

(87) PCT Pub. No.: WO2018/189508
PCT Pub. Date: Oct. 18, 2018

(65) Prior Publication Data
US 2019/0366421 A1  Dec. 5, 2019

(30) Foreign Application Priority Data
Apr. 10, 2017 (GB) ..................... 1705753

(51) Int. Cl.
*F16B 15/08* (2006.01)
*B21J 15/02* (2006.01)
(Continued)

(52) U.S. Cl.
CPC .......... *B21J 15/025* (2013.01); *B21J 15/323* (2013.01); *B21J 15/043* (2013.01); *B21J 15/105* (2013.01);
(Continued)

(58) Field of Classification Search
CPC ............................... B21J 27/00; B21J 15/323
(Continued)

(56) References Cited

U.S. PATENT DOCUMENTS 2,042,286 A * 5/1936 Wilson ............... A44B 17/0058
112/406
2,552,114 A * 5/1951 Reinhard ........... A47G 27/0462
156/92
(Continued)

FOREIGN PATENT DOCUMENTS

CN 205114042 U 3/2016
DE 202012003276 U1 8/2012
(Continued)

OTHER PUBLICATIONS

International Search Report and Written Opinion for Application No. PCT/GB2018/050883 dated Mar. 29, 2018, (19 pages).
(Continued)

*Primary Examiner* — Gary W Estremsky
(74) *Attorney, Agent, or Firm* — Michael Best & Friedrich LLP

(57) ABSTRACT

A rivet tape joining clip (302) comprising an elongate body provided with a plurality of projections (310) which extend from one side of the elongate body, wherein the projections are provided with laterally projecting lips. The invention further relates to different apparatuses and methods used for the joining of rivet tapes.

29 Claims, 35 Drawing Sheets

(51) Int. Cl.
  *B21J 15/32* (2006.01)
  *B21J 15/04* (2006.01)
  *B21J 15/10* (2006.01)
  *B23P 19/00* (2006.01)
  *F16B 27/00* (2006.01)

(52) U.S. Cl.
  CPC ............. *B23P 19/001* (2013.01); *F16B 27/00* (2013.01); *Y10T 403/55* (2015.01)

(58) Field of Classification Search
  USPC .......... 411/442, 443; 403/292, 293; 156/157
  See application file for complete search history.

(56) References Cited

U.S. PATENT DOCUMENTS

| | | | | |
|---|---|---|---|---|
| 3,141,346 | A * | 7/1964 | Dean | F16G 3/08 198/846 |
| 3,758,355 | A * | 9/1973 | Witherow | B29C 66/1122 156/157 |
| 3,853,654 | A * | 12/1974 | Patton | B29C 66/43 156/157 |
| 4,290,832 | A | 9/1981 | Kalleberg | |
| 4,404,742 | A * | 9/1983 | Fuhrmeister | B21J 15/00 29/798 |
| 4,563,563 | A * | 1/1986 | Ege | B23K 3/087 219/106 |
| 5,062,566 | A * | 11/1991 | Ege | B23K 1/0008 228/102 |
| 6,073,334 | A * | 6/2000 | Asai | H05K 13/0215 29/513 |
| 6,820,309 | B1 * | 11/2004 | Gersbach | F16G 3/08 198/844.2 |
| 8,162,196 | B2 * | 4/2012 | Gasser | F16B 27/00 227/135 |
| 8,782,985 | B2 * | 7/2014 | Gulbrandsen | E04B 9/30 52/506.07 |
| 8,870,510 | B2 * | 10/2014 | Greenwood | B21J 15/28 411/501 |
| 9,308,686 | B2 | 4/2016 | Khan | |
| 9,316,285 | B2 * | 4/2016 | DeMont | F16G 3/08 |
| 2006/0213606 | A1 * | 9/2006 | Achiwa | B26B 17/00 156/159 |
| 2007/0123069 | A1 | 5/2007 | Choi et al. | |
| 2007/0292239 | A1 * | 12/2007 | Lin | F16B 27/00 411/442 |
| 2013/0001116 | A1 * | 1/2013 | Lin | F16B 27/00 206/347 |
| 2013/0272804 | A1 | 10/2013 | Kremser | |
| 2014/0217227 | A1 * | 8/2014 | Kilibarda | B21J 15/025 242/555.3 |
| 2015/0226286 | A1 * | 8/2015 | Phillips | F16G 3/06 24/38 |
| 2016/0031349 | A1 * | 2/2016 | Lee | A44B 18/0069 24/449 |
| 2017/0266716 | A1 * | 9/2017 | Haddix | B29C 66/12842 |
| 2019/0255597 | A1 * | 8/2019 | MacDougall | B21J 15/323 |

FOREIGN PATENT DOCUMENTS

| | | |
|---|---|---|
| EP | 0324577 A1 | 7/1989 |
| EP | 0893948 A2 | 1/1999 |
| JP | 2004161355 A | 6/2004 |
| WO | 2004047511 A1 | 6/2004 |
| WO | 2014005375 A1 | 1/2014 |

OTHER PUBLICATIONS

International Preliminary Report on Patentability for related Application No. PCT/GB2018/050883 dated Oct. 15, 2019 (12 pages).
Search Report issued from the United Kingdom Patent Office for related application No. GB1705753.0 dated May 4, 2017 (4 pages).
Search Report issued from the United Kingdom Patent Office for related application No. GB1705753.0 dated Oct. 27, 2017 (2 pages).
Chinese Patent Office First Office Action for Application No. 201880021217.7 dated Nov. 20, 2020 (11 pages including English summary).
Korean Intellectual Property Office Action for Application No. 10-2019-7032558 dated Jul. 29, 2021 (11 pages including English translation).
Japanese Patent Office Action for Application No. 2020504453 dated Apr. 5, 2022 (10 pages including English translation).

* cited by examiner

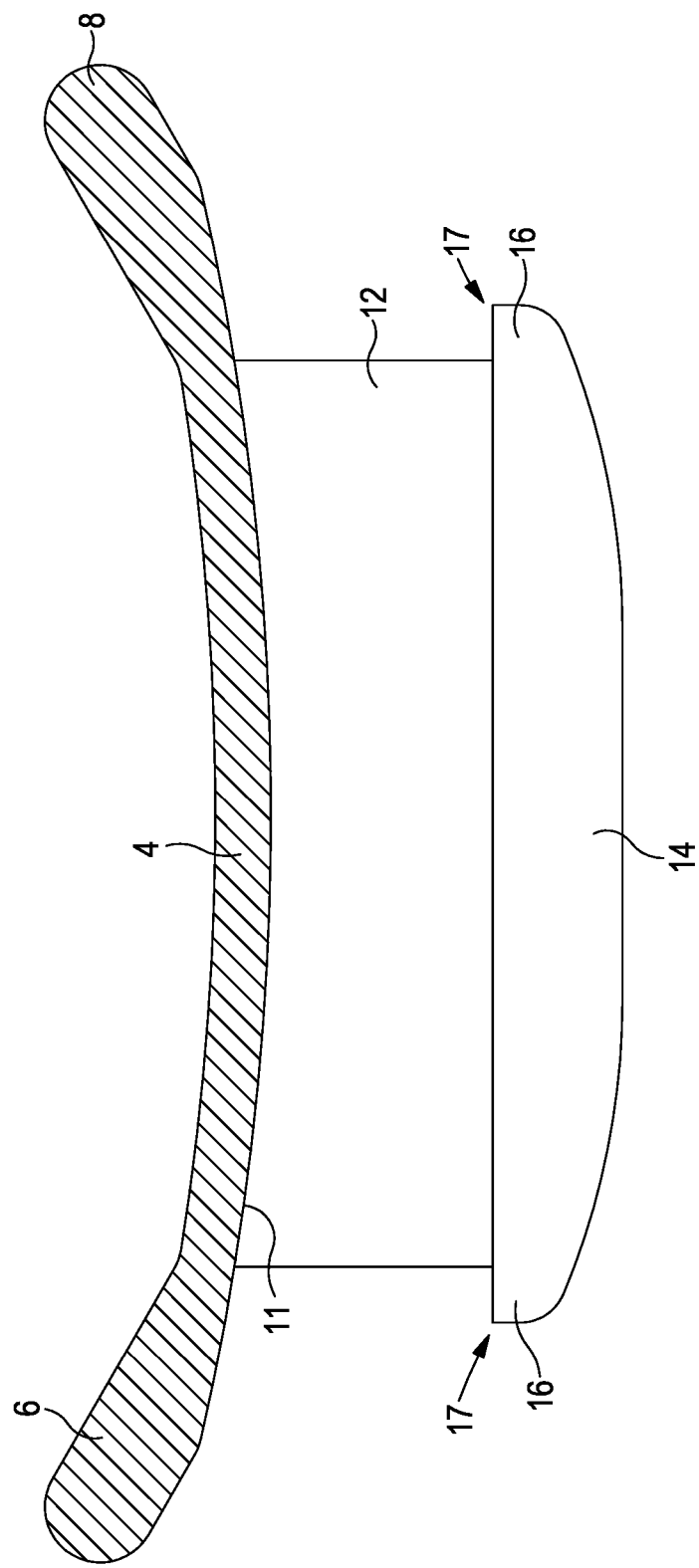

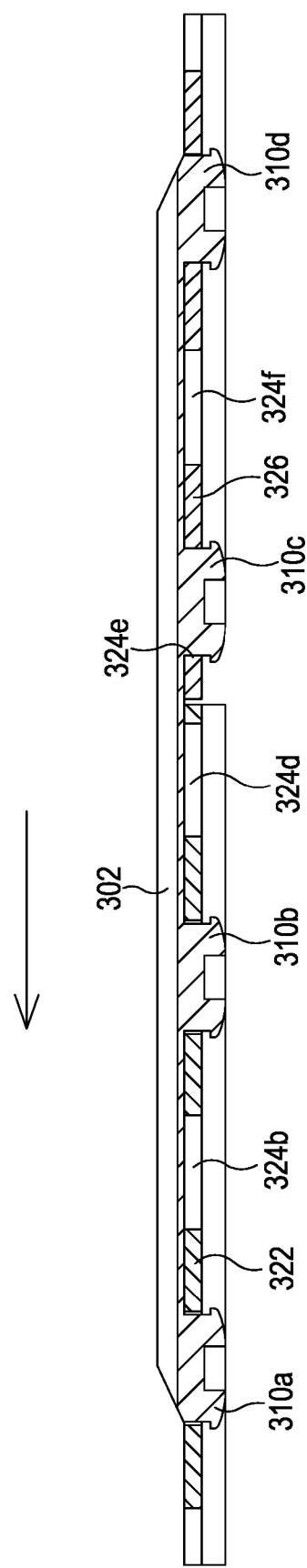

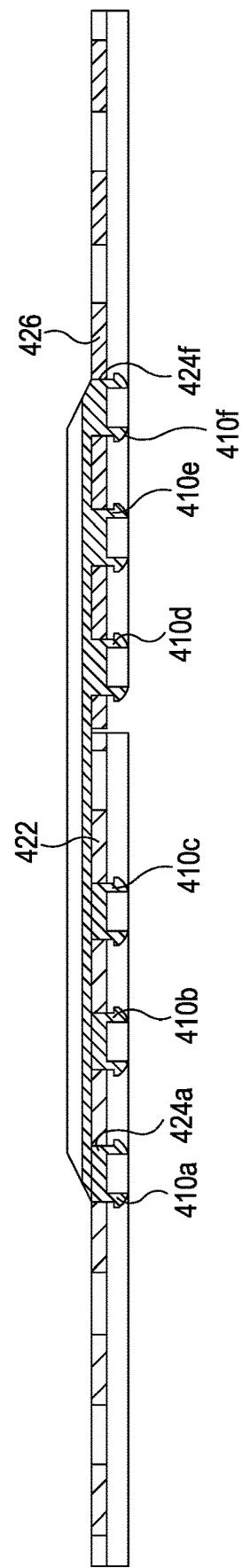

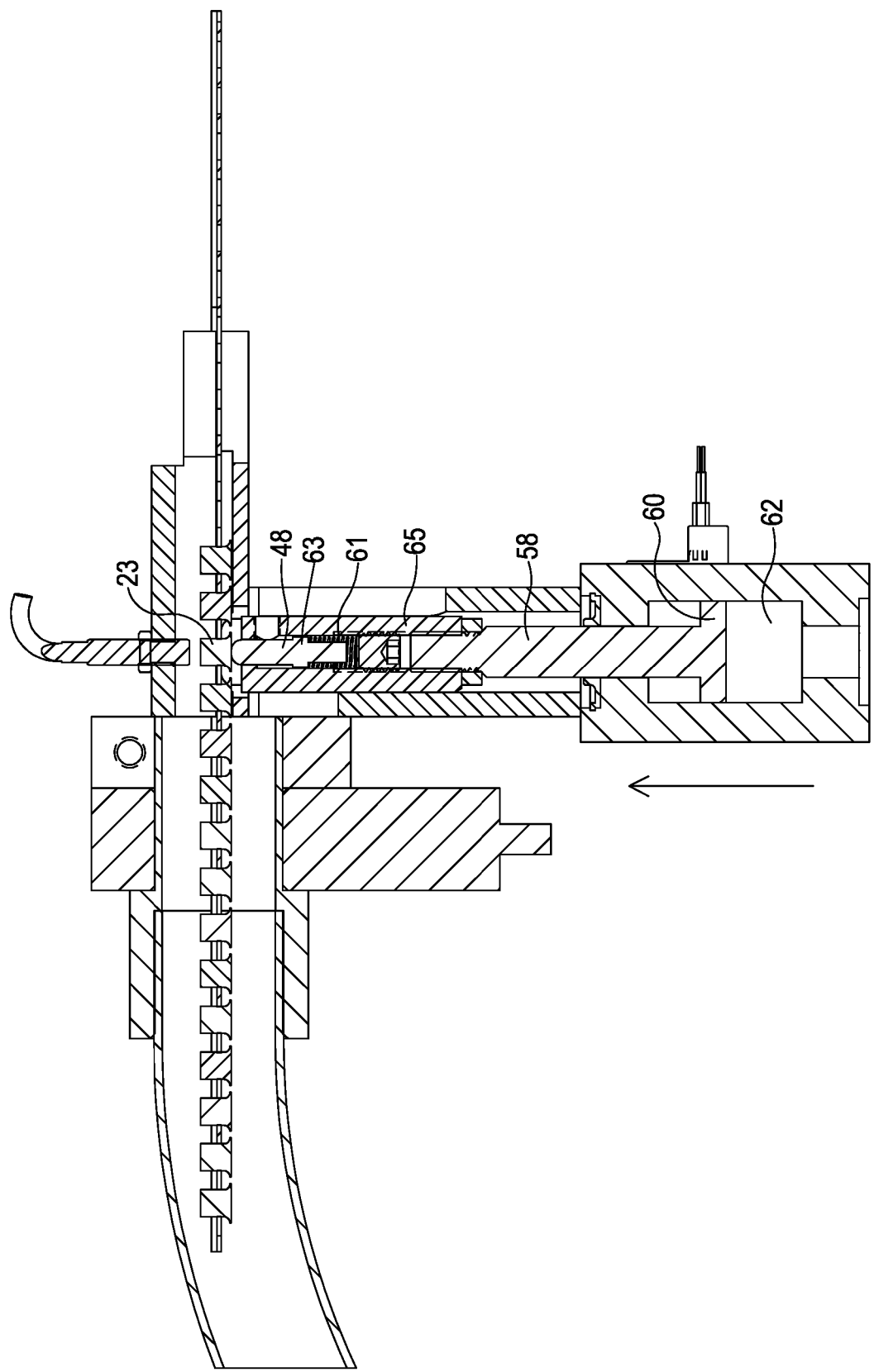

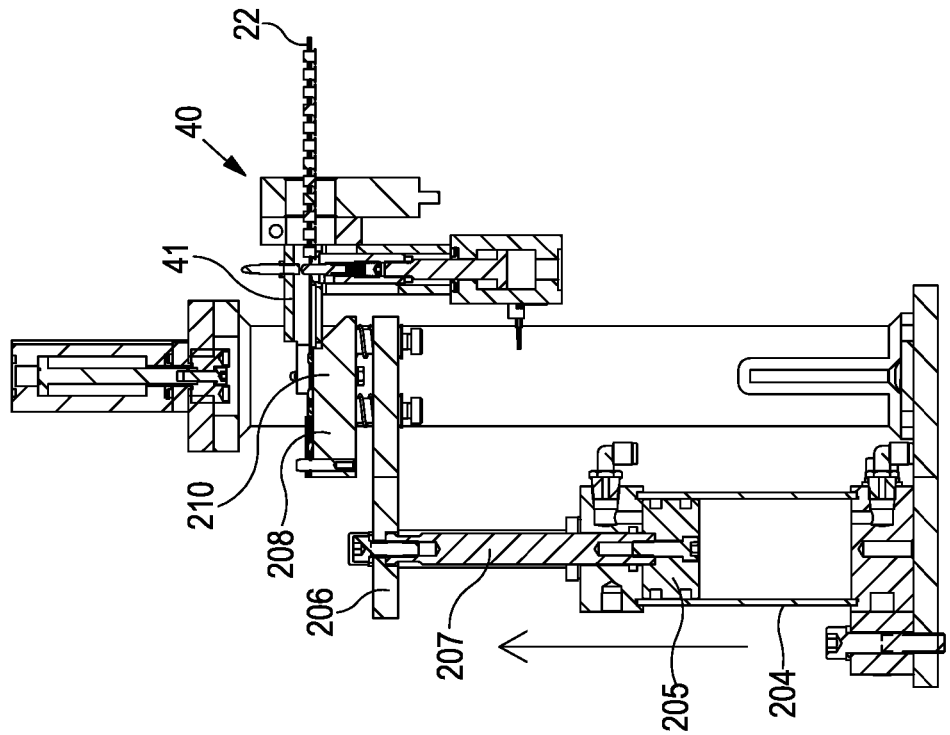
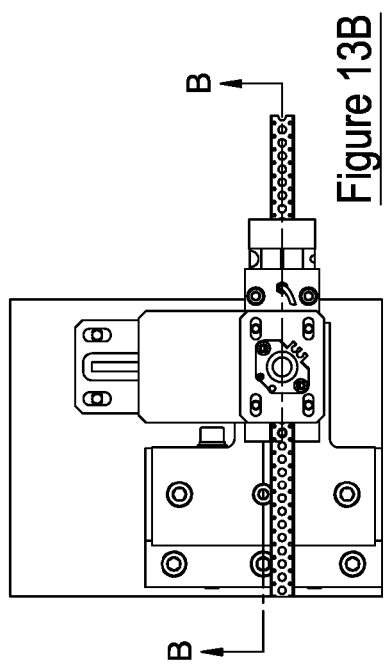
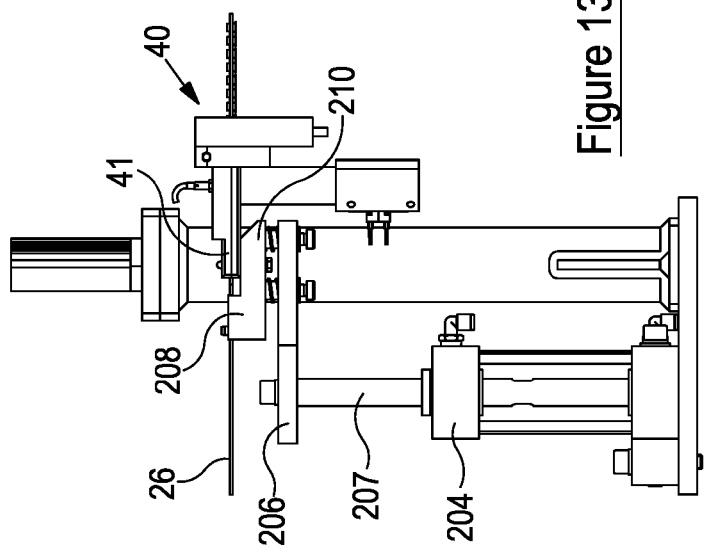

RIVET TAPE JOINING

FIELD

The present invention relates to methods and apparatus related to joining together two tapes which hold rivets (e.g. self-piercing rivets). Such tapes may be referred to as rivet tapes.

BACKGROUND

Self-piercing riveting (SPR) is a spot-joining technique in which a self-piercing rivet is driven, by a punch, into a layered workpiece supported by a die. The die is shaped so that as the rivet is driven into the workpiece towards the die the material of the workpiece plastically deforms. This flow of workpiece material causes the annular tip of the rivet to flare outwards and remain encapsulated by an upset annulus of the workpiece material. The flared tip of the rivet interlocking with the upset annulus of the workpiece prevents removal of the rivet or a separation of the layers of the workpiece.

Self-piercing riveting is used in factories, for example during assembly of vehicles. A rivet insertion tool and die may be mounted on a robotic arm which moves between different rivet insertion points on a workpiece (e.g. a vehicle body). The robotic arm may be one of many robotic arms in a factory, with the robotic arms for example being distributed along a production line. When the robotic arms are in motion, for safety reasons operators are not permitted to enter the environment of the robotic arms (which may be referred to as a controlled environment). If a supply of self-piercing rivets for a rivet insertion tool on one robotic arm were to run out then operation of that rivet setting tool would need to be suspended until the supply of rivets was replenished. Replenishing the rivets requires all of the robotic arms and riveting tools in the controlled environment to stop operation in order to allow an operator to safely access the riveting tool which requires replenishing. This is disadvantageous because it will suspend operation of the production line.

A supply of rivets to a rivet insertion tool may be provided as a spool of rivet tape along which self-piercing rivets are distributed. The spool of rivet tape is wound onto a reel, and is fed from the reel through a nose of the self-piercing riveting tool. The riveting tool pushes rivets out of the rivet tape and into the workpiece. In an environment such as a production line in which many riveting tools are provided on robotic arms and are fed using rivet tapes of rivets, rivet tapes for several different tools may be replenished at the same time. This is advantageous because it avoids having to interrupt operation of the production line each time the supply of rivets to a riveting tool runs out, and thereby reduces lost production time. However, a disadvantage of this approach is that some spools of rivet tape will only be partially used when they are replaced, leading to a considerable wastage of rivets.

It may be desirable to provide methods and apparatus related to joining tapes which overcome a disadvantage associated with the prior art.

SUMMARY

According to an aspect of the invention there is provided a rivet tape joining clip comprising an elongate body provided with a plurality of projections which extend from one side of the elongate body, wherein the projections are provided with laterally projecting lips.

The rivet tape joining clip may be used to join pieces of rivet tape together, with the laterally projecting lips providing secure engagement between the projections and the rivet tape. The rivet tape joining clip is advantageous because it allows leftover pieces of rivet tape to be joined together and then used for rivet insertion. The rivet tape joining clip may also be used for automated connection of spools of rivet tape.

The laterally projecting lips may be located at distal ends of the projections.

The elongate body may be provided with two inner projections located towards a centre of the elongate body and two outer projections located towards ends of the elongate body.

A separation between the outer projections and a respective inner projection may be double a separation between the inner projections.

The clip may include a pair of projections with a separation that is smaller than the separation between other projections or is smaller than a multiple of the separation between other projections.

The difference in separations may correspond with stretching that occurs between the pair of projections when the clip is used.

The difference in separations may be up to around 2 mm.

The difference in separations may be around 1 mm.

The clip may be provided with four projections. An inner pair of projections may have a separation which is smaller than the separation between other projections. The separation may be smaller by around 1 mm.

The clip may be provided with six projections. An inner pair of projections may have a separation which is less than twice the separation between other projections. The separation may be smaller by around 1 mm The elongate body may be provided with four or more projections.

The projections may be provided with a convex lowermost surface.

An upper edge of each lip may step inwardly to meet an inner portion of the projection.

The elongate body may comprise an inner portion, and outer portions provided on either side of the inner portion. The outer portions may be thicker than the inner portion.

The clip may have a face at each end of the elongate body. Each face may taper outwardly from an end point of the clip.

The projections may be generally cylindrical.

According to a second aspect of the invention there is provided a rivet tape joining clip comprising an elongate body provided with four or more generally cylindrical projections which extend from one side of the elongate body.

According to a third aspect of the invention there is provided a rivet tape joining clip according to the first or second aspect of the invention, the rivet tape joining clip being engaged in first and second rivet tapes, wherein projections of the rivet tape joining clip pass through holes of the first and second rivet tapes.

Lips of the projections may be wider than the holes and thereby hold the rivet tape securely on the rivet tape joining clip.

Adhesive may be provided between the rivet tape joining clip and the first and second rivet tapes.

The separation between projections of the rivet tape joining clip may be such that a regular separation between sprocket holes is maintained across the first and second rivet tapes.

The regular separation between sprocket holes may be maintained only during use, via stretching of the rivet tape joining clip.

Projections of the rivet tape joining clip may pass through holes of the first tape but not through a final hole of the first tape. Projections of the rivet tape joining clip may pass through holes of the second tape including a first hole of the second tape.

An end of the second tape may be provided with a non-square cut. The non-square cut may also be referred to as a non-straight cut.

An end of the second tape may be provided with a three-sided cut. An end of the second tape may be provided with a semi-circular cut, an arced cut, or some other non-straight cut.

An end of the first tape may be provided with a square cut.

A land behind a final hole of the first tape may be shorter than a land in front of a first hole of the second tape.

According to a fourth aspect of the invention there is provided a rivet tape securing apparatus comprising a housing which defines an opening configured to receive rivet tape during use, a resiliently biased finger mounted on an actuator, and a controller configured to operate the actuator to move the resiliently biased finger into and out of the opening defined by the housing.

The fourth aspect of the invention allows the resiliently biased finger to be brought into contact with the rivet tape when it is desired to secure the rivet tape. The rivet tape may then be pulled over the resiliently biased finger until the resiliently biased finger enters a hole in the rivet tape.

The actuator may comprise a sleeve, the finger being retractable at least partially into the sleeve and being resiliently biased out of the sleeve.

The resilient bias may be provided by a spring. The spring may be located inside the sleeve and may which engage with the finger.

An upper end of the sleeve may comprise side walls which are spaced apart from each other in a direction which is transverse to a direction of travel of the rivet tape.

The apparatus may further comprise a sensor configured to detect that the resiliently biased finger has passed through a hole in the rivet tape.

An upper end of the resiliently biased finger may be rounded.

The apparatus may further comprise a rivet sensor configured to detect the passage of rivets past the sensor.

The apparatus may further comprise a control system configured to operate the actuator to move the finger towards a rivet tape such that the finger is biased against the tape when the rivet sensor provides an output indicating that rivet tape without rivets is passing the sensor.

The control system may be configured to monitor for an output signal from the sensor which indicates that the finger has passed through a hole in the tape.

The distal end of the housing may include a first side portion configured to support one edge of a rivet tape and a second side portion configured to support an opposite edge of the rivet tape, and a channel located between the side portions configured to accommodate an unsupported central portion of the rivet tape.

According to a fifth aspect of the invention there is provided a rivet tape cutting apparatus comprising a pair of jaws between which a gap is provided, the gap being open at one end, and a blade connected to an actuator, the actuator being configured to move the blade across the gap to cut a rivet tape, wherein a first part of the gap on a first side of the jaws is wider than a second part of the gap on an opposite side of the jaws. The first part of the gap may be dimensioned to receive a rivet tape and the second part of the gap may be dimensioned to receive a distal end of a rivet tape securing apparatus.

The rivet tape cutting apparatus advantageously allows the rivet tape to be cut at a closely controlled position along the rivet tape.

The first part of the gap may be wider at an outer end of the gap than at an inner end of the gap.

The first part of the gap may taper outwardly at an outer end of the gap.

The second part of the gap may be wider at an outer end of the gap than at an inner end of the gap.

The second part of the gap may have a distal end provided with outwardly tapering side faces.

The rivet tape cutting apparatus may further comprise a ridge and groove arrangement configured to guide the blade when the blade is moved across the gap by the actuator.

The jaws of the cutting apparatus may be formed in a block. The block may be connected to a stand by resilient connections which allow the block to move relative to the stand but which bias the block to an equilibrium position relative to the stand.

A slot may be provided in the stand, the slot being open at one end to receive rivet tape. An outer end of the slot may be provided with outwardly sloping faces.

According to a sixth aspect of the invention there is provided a rivet tape joining apparatus comprising a rivet tape and clip holding block, a pressing block and an actuator configured to move the rivet tape and clip holding block and the pressing block together, wherein a lowermost surface of the pressing block is provided with at least two recesses.

The rivet tape joining apparatus advantageously allows rivet tape to be pressed onto a rivet tape holding clip, with projections of the rivet tape holding clip passing into the recesses in the pressing block.

The tape and clip holding block may comprise two raised portions which define a channel between them.

One or more fingers may project upwardly from the channel to receive a hole of a rivet tape.

The actuator may be connected to the pressing block and may be configured to move the pressing block towards the rivet tape and clip holding block.

An additional actuator may be connected to the rivet tape and clip holding block, and may be configured to move the rivet tape and clip holding block towards the pressing block.

The rivet tape and clip holding block may be connected to the additional actuator by resilient connections which allow the rivet tape and clip holding block to move relative to the additional actuator but which bias the rivet tape and clip holding block to an equilibrium position relative to the additional actuator.

The rivet tape holding block may include a step configured to engage with a step of the rivet tape securing apparatus.

The pressing block may be elongate and the at least two recesses may be provided at ends of the elongate pressing block.

According to a seventh aspect of the invention there is provided an apparatus comprising the rivet tape securing apparatus of the fourth aspect of the invention and the rivet tape joining apparatus of the sixth aspect of the invention, wherein the rivet tape securing apparatus includes one or more openings or projections and the rivet tape joining apparatus includes one or more projections or openings, the one or more openings and projections being configured to engage with each other when the rivet tape securing apparatus and the rivet tape joining apparatus are brought together.

The rivet tape securing apparatus and rivet tape joining apparatus are advantageous because they allow the rivet tape to be positioned accurately for joining to another rivet tape.

A distal end of the rivet tape securing apparatus may have first and second side portions separated by a channel. The rivet tape joining apparatus may have first and second raised portions separated by a channel. The channels may be configured to align when the rivet tape securing apparatus and the rivet tape joining apparatus are brought together.

The channel of the rivet tape securing apparatus may have substantially the same width as the channel of the rivet tape joining apparatus.

The pressing block may be configured to pass into the channel of the rivet tape securing apparatus and into the channel of the rivet tape joining apparatus.

According to an eighth aspect of the invention there is provided an apparatus comprising the rivet tape securing apparatus of the fourth aspect of the invention and the rivet tape cutting apparatus of the fifth aspect of the invention, wherein the housing of the rivet tape securing apparatus has a distal end, and wherein the first part of the gap between the jaws of the rivet tape cutting apparatus is dimensioned to receive the distal end of the rivet tape securing apparatus.

Because the rivet tape securing apparatus can be received in the jaws of the rivet tape cutting apparatus, this allows accurate determination of the position at which the rivet tape is cut by the rivet tape cutting apparatus.

According to a ninth aspect of the invention there is provided a method comprising joining first and second rivet tapes together using the rivet tape joining clip of the first aspect, and then using a riveting tool to insert rivets from the first and second tapes into workpieces. The workpieces may form part of a vehicle.

According to a tenth aspect of the invention there is provided a method of securing a rivet tape comprising using an actuator to move a resiliently biased finger into contact with the rivet tape, then passing the rivet tape over the resiliently biased finger until the finger meets a hole in the rivet tape and is biased into the hole.

The method advantageously allows the rivet tape to be secured in a desired position in a simple and straightforward manner.

A sensor may provide an output signal when the finger passes into the hole in the rivet tape.

According to an eleventh aspect of the invention there is provided a method of cutting rivet tape which comprises using a rivet tape securing apparatus to secure the rivet tape according to the method of the tenth aspect, engaging a distal end of a rivet tape securing apparatus into jaws of a rivet tape cutting apparatus such that the rivet tape passes through the jaws of the rivet tape cutting apparatus, then moving a blade across a gap defined by the jaws.

According to a twelfth aspect of the invention there is provided a method of joining rivet tapes, the method comprising holding a first rivet tape and clip using the rivet tape joining apparatus of the sixth aspect of the invention, holding a second rivet tape using the rivet tape securing apparatus of the second aspect, and using the pressing block of the rivet tape joining apparatus to press the second rivet tape onto the clip such that the second rivet tape engages with the clip.

The method may further comprise using a riveting tool to insert rivets from the first tape or the second tape into workpieces. The workpieces may form part of a vehicle.

According to a thirteenth aspect of the invention there is provided a rivet tape cutting apparatus comprising a tape supporting structure, a tape securing apparatus, a blade and an actuator, wherein the actuator is configured to move the blade and the tape supporting apparatus relative to each other to cut the rivet tape, and wherein the tape securing apparatus is configured to secure a hole of the rivet tape at a fixed separation from the blade.

The tape securing apparatus may comprise a peg received in a bore of the tape supporting structure.

The peg may project from a block which is configured to extend across the rivet tape.

A second peg may project from a different side of the block, the peg and the second peg having different diameters The tape supporting structure may be provided with a second bore, the bore and the second bores having diameters which correspond with the diameters of the peg and the second peg.

The blade may be fixed and the actuator may be configured to move the tape supporting structure towards the blade.

The blade may comprise three blade portions, a first blade portion configured to form a square cut of a central portion of the second rivet tape, the second and third blade portions configured to form angled cut portions either side of the central portion. The blade may be curved. The blade may be semi-circular or arced.

The rivet tape cutting apparatus may further comprise a second blade and a second tape securing apparatus configured to secure a hole of a second rivet tape at a fixed separation from the additional blade.

The tape supporting structure may comprise a plate provided with an opening.

Edges of the opening of the tape supporting structure may be aligned with edges of the first and second blades, such that relative movement between the blades and the tape supporting structure cuts into the rivet tapes with a guillotine-like action.

Features of different aspects of the invention may be combined together.

Rivet tapes secured together using a clip according to an aspect of the invention may be used to insert rivets into workpieces. The workpieces may form part of a vehicle.

BRIEF DESCRIPTION OF THE DRAWINGS

Embodiments of the invention will now be described, by way of example only, with reference to the accompanying schematic drawings, in which:

FIGS. 1A-D depict a clip for joining together two rivet tapes

FIGS. 4A-D depict a clip and tape according to an alternative embodiment of the invention;

FIGS. 5A-C depict a clip and tape according to a further alternative embodiment of the invention;

FIGS. 5C and 5D depicts with the rivet tape but without the clip;

FIGS. 8A-D depict a rivet tape securing apparatus together with the rivet tape;

FIGS. 13A-C depict operation of the rivet tape joining apparatus;

FIG. 1 depicts a clip 2 for joining together two rivet tapes. The clip 2 is depicted in perspective view in FIG. 1A, in side view in FIG. 1B, in a first cross-section in FIG. 10 and in a second cross-section in FIG. 1D.

Figure 1A:
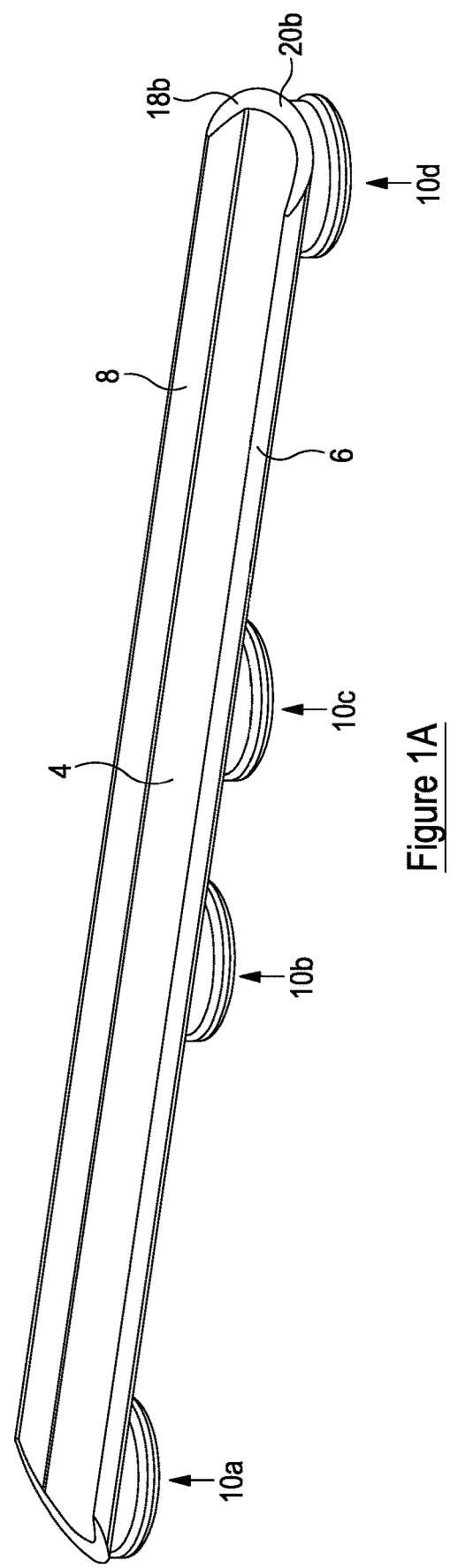

The clip 2 is elongate, comprises a central portion 4 and first and second side portions 6,8 which extend either side of the central portion. The side portions 6,8 are thicker than the central portion 4. The side portions 6,8 may for example be around twice as thick as the central portion. The central portion 4 may for example have a thickness of around 0.3 mm and the side portions 6,8 may for example have a thickness of around 0.6 mm (measured across the thickest point of the side portions). The central portion 4 maybe sufficiently thin that it can pass beneath a switch in a nose of a rivet insertion tool without triggering that switch (as described further below). The central portion 4 may not be thick enough to give the clip sufficient tensile strength. The side portions 6,8 give the clip 2 additional tensile strength. This allows the clip 2 to be used to pull a rivet tape through a rivet insertion tool without significant stretching of the clip (e.g. the stretching being sufficiently small that a desired separation remains between sprocket wheel holes of tapes joined by the clip).

Four projections 10a-d extend from a bottom surface 11 of the clip 2. The term "bottom surface" is used for convenience to describe the clip as shown in the figures, and is not intended to imply that the clip 2 must always have the orientation depicted in the figures. The projections 10a-d are generally cylindrical. Each projection 10 comprises an inner portion 12 and an outer portion 14. The inner portion 12 of each projection 10 is connected to the central portion 4 of the clip 2. The outer portion 14 of each projection 10 is connected to the inner portion 12 and includes a lip 16. Each projection includes a blind bore 15 which extends fully through the outer portion 14 and partway into the inner portion 12. The clip 2 may be formed using injection moulding. The blind bores 15 in the projections 10 advantageously reduce distortion of the projections which may be caused by the injection moulding process. The blind bores 15 also provide a central locating feature which may be used to align a hand tool that can be used to press rivet tape over the projections 10 when engaging the clip 2 into the tape. Blind bores of clips according to other embodiments provide the same advantages.

The lip 16 extends around the circumference of each projection 10, and projects laterally such that the diameter of the outer portion 14 is greater than the diameter of the inner portion 12. At an upper end of the lip 16 the diameter of the projection 10 steps inwards. An outer edge of the step has a sharp corner 17 (e.g. a corner which does not include significant rounding). The sharp corner 17 may help to retain rivet tape on the clip as explained further below. A bottom end of the outer portion 14 is convex and is curved. The radius of curvature of the bottom end of the outer portion 14 increases towards an outer edge of the lip 16. The curved form of the bottom end of the outer portion 14 may help the projection 10 to pass into a rivet tape hole as explained further below.

Each projection 10 may for example have a length of around 2.3 mm. The inner portion 12 of each projection may for example have a length of around 1.4 mm. The outer portion 14 of each projection may for example have a length of around 0.7 mm. The blind bore 15 may for example have a depth of around 1.5 mm. The inner portion 12 of each projection may for example have a diameter of around 4.9 mm. The outer portion 14 of each projection may for example have a diameter of around 5.5 mm. The blind bore 15 may for example have a diameter of around 2 mm. The bottom end of each outer portion 14 may for example have a radius of curvature of around 4.1 mm. The radius of curvature may decrease to around 0.25 mm towards an outer edge of each lip 16.

The separation between first and second projections 10a,b and between third and fourth projections 10c,d is double the separation between second and third projections 10b,c. For example, first and second projections 10a,b of the clip may be separated by 18 mm (the separation being measured between centre points of the projections). Second and third projections 10b,c may be separated by 9 mm. Third and fourth projections 10c,d may be separated by 18 mm.

The above example dimensions are merely illustrative and are not intended to be limiting. The example dimensions may for example be for a clip intended to be used for rivet tape which holds rivets with 5 mm diameter shanks. The dimensions may be scaled as desired for rivet tape which holds rivets with smaller diameter shanks (e.g. 3 mm) or larger diameter shanks.

The clip 2 is formed from resilient material. The clip 2 may be formed from plastic, for example nylon 66. The resilience of the clip 2 allows the clip to bend when it passes through a rivet insertion tool (as described below).

The clip has faces 18a,b at either end. Each face 18a,b tapers outwardly from an end point 20a,b of the clip. This tapered configuration may reduce the risk of the clip becoming caught in a rivet insertion tool, and allows a switch to move smoothly over the surface of the clip without being triggered (as is explained further below).

Figure 2A:
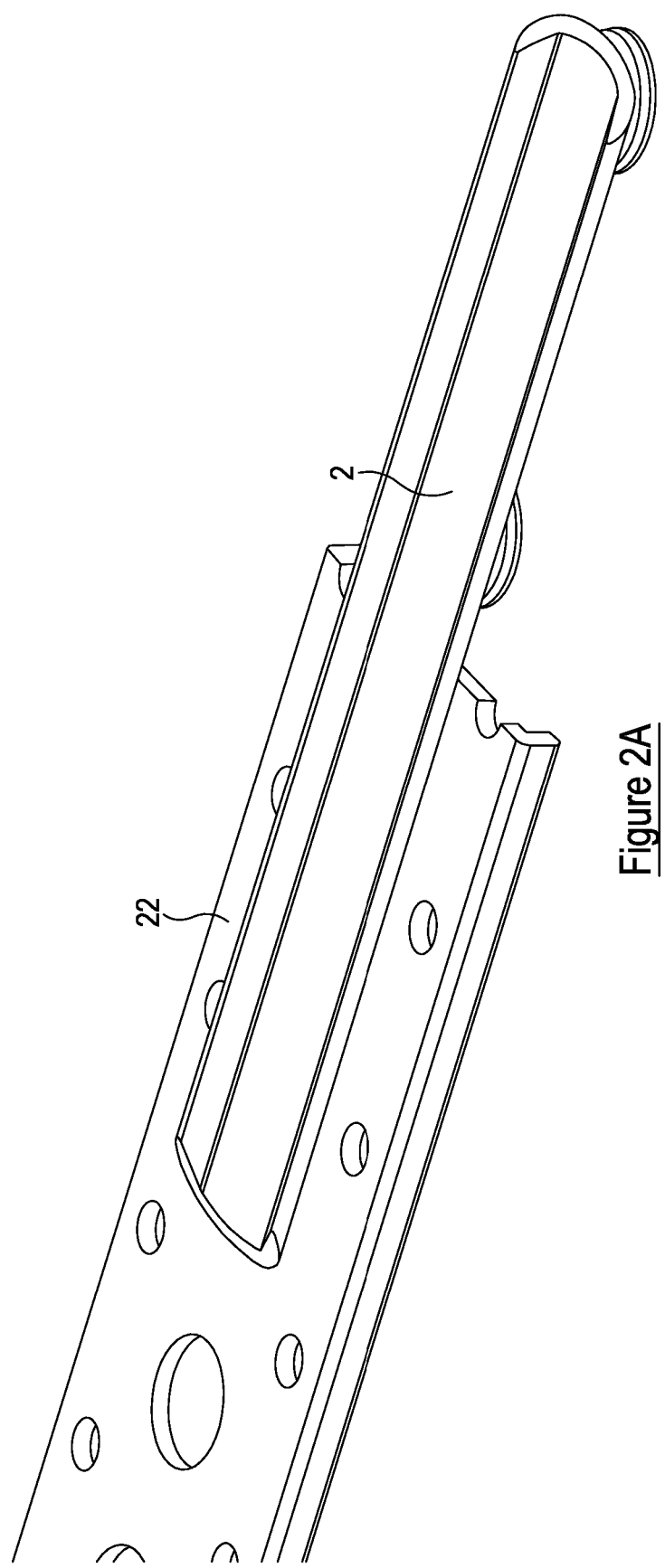
FIGS. 2A-C depict the clip fastened to a first rivet tape.
Figure 2B:
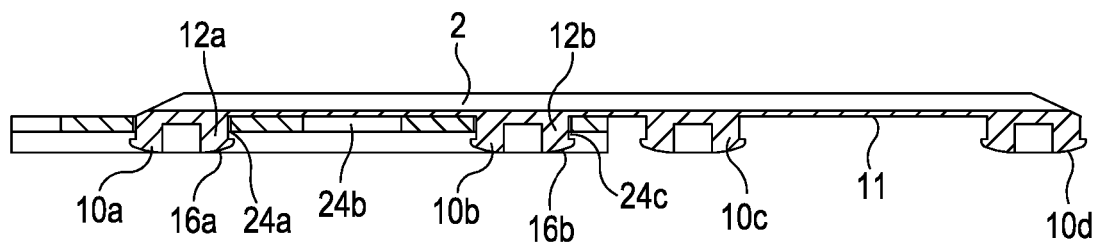
Figure 2C:
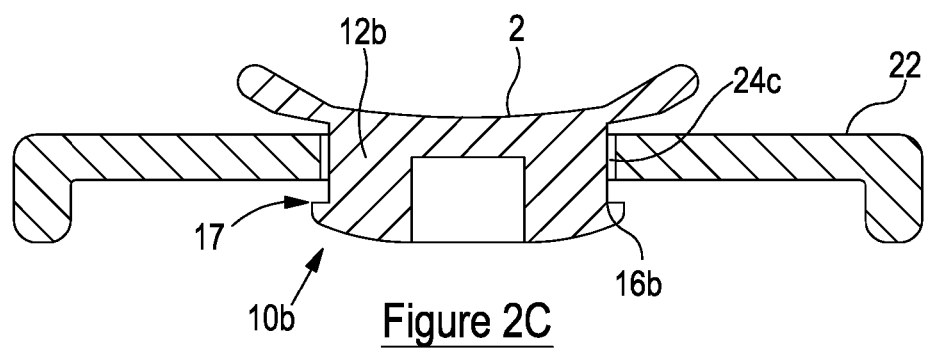

FIG. 2 depicts the clip 2 after it has been fastened to an end of a rivet tape 22, FIG. 2A is a perspective view from above, FIG. 2B is a cross-sectional view from one end and FIG. 2C is a cross-sectional view from one side. The projections 10a,b extend through holes 24a,c in the rivet tape 22. The holes 24a-c are dimensioned to hold self-piercing rivets. The inner portions 12a,b of the projections 10a,b have a diameter which corresponds with or is smaller than the diameter of the holes 24a-c in the rivet tape 22. The lips 16a,b of the projections 10a,b have a diameter which is greater than the diameter of the holes 24a,c in the rivet tape.

The rivet tape is typically made from polypropylene and includes some resilience. When the rivet tape 22 is pressed onto the clip 2, holes 24a,c of the rivet tape stretch outwardly. This outward stretching of the rivet tape 22 is encouraged by the convex curved shape of the bottom surfaces of the projections 10a,b. The rivet tape 22 stretches over the lips 16a,b and the projections 10a,b pass into the holes 24a,c. Once the lips 16a,b have passed through the holes 24a,c of the rivet tape, the holes then contract around the projections 10a,b. The lips 16a,b hold the rivet tape 22 in place on the clip 2. Because the upper end of each lip 16a,b is stepped rather than curved, the rivet tape 22 is prevented from easily being pulled off the projections 10a,b.

The sharp corner 17 at the edge of each lip 16a,b may also help to prevent the rivet tape 22 from being easily pulled off the projections 10a,b. Thus, the lips 14a,b hold the rivet tape 22 securely in place on the clip 2.

The holes 24a,c of the rivet tape through which the projections 10a,b extend are separated by an intermediate hole 24b. By engaging first and third holes 24a,c which are separated by an intermediate second hole 24b, the clip 2 provides stronger engagement with the rivet tape 22 than would otherwise be the case. For example, lateral movement of the clip (e.g. rotational movement in the plane of the rivet tape) is more effectively restricted than would be case if the clip 2 only engaged the first and second holes 24a,b of the rivet tape. In another example, when the rivet tape and clip are bent inwardly (i.e. bent about a curve with the clip 2 innermost and the rivet tape 22 outermost) the ability of the clip to bend with the rivet tape without becoming disengaged from the rivet tape is improved (compared with the case if the clip only engaged first and second holes 24a,b of the rivet tape).

The clip may be provided with projections configured to extend through the first three holes 24a-c of the rivet tape 22. However, a disadvantage of this is that more force is required to push the projections into the holes in the rivet tape. By engaging with two spaced apart holes of the rivet tape 22, the clip 2 provides stable engagement of the rivet tape without requiring additional force for clip insertion.

Figure 3A:
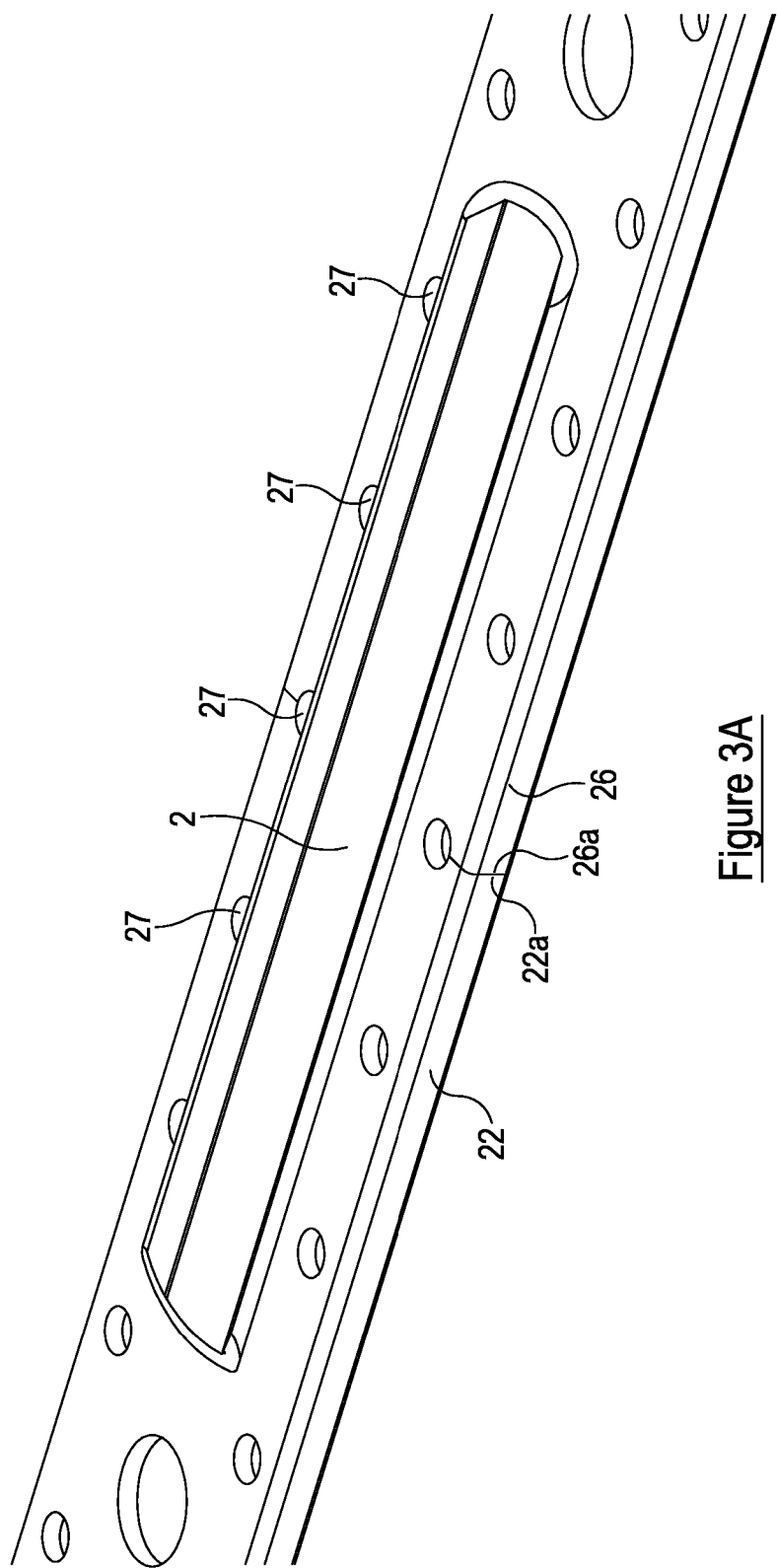
FIGS. 3A-C depict the clip fastened to the first rivet tape and fastened to a second rivet tape.
Figure 3B:
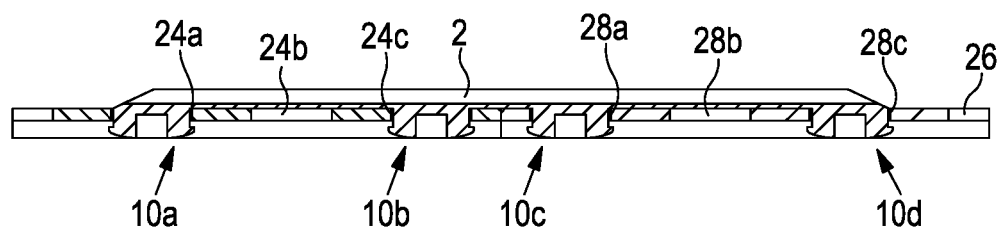
Figure 3C:
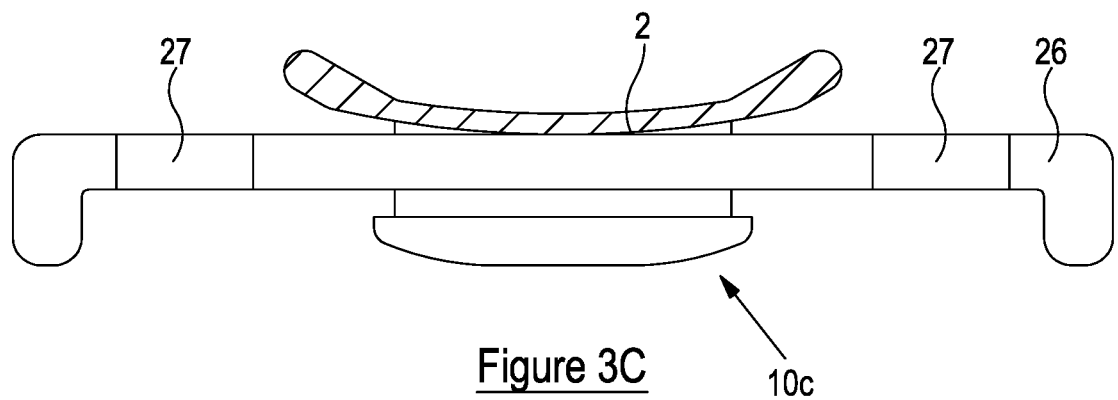

FIG. 3 depicts the clip 2 still fastened to the first rivet tape 22, but now also fastened to a second rivet tape 26. FIG. 3A is a perspective view from above, FIG. 3B is a cross-sectional view from one end and FIG. 3C is a cross-sectional view from one side. The engagement of the clip 2 with the second rivet tape 26 corresponds with the engagement of the clip with the first rivet tape 22. That is, projections 10c,d extend through first and third holes 28a,c in the second rivet tape 26. The first and third holes 28a,c which are engaged by the clip 2 are separated by an intermediate second hole 28b.

As will be appreciated from FIG. 3B, the separation between the second and third projections 10b,c of the clip 2 corresponds with the separation between adjacent holes 24a-c, 28a-c of the rivet tapes 22, 26. Thus, the rivet tapes 22, 26 when joined together have a series of holes 24a-c, 28a-c which are all separated by the same distance from adjacent holes. This is advantageous because the rivet tapes 22, 26 are provided with sprocket holes 27, and the separation between adjacent sprocket holes is maintained when transitioning between tapes. The sprocket holes 27 allow a motor to pull the rivet tapes 22, 26 through a rivet insertion tool using a sprocket wheel (as explained further below). Because the separation between sprocket holes 27 is maintained when transitioning between rivet tapes 22, 26, the sprocket wheel is able to pull the rivet tapes without becoming disengaged when the transition between rivet tapes passes over the sprocket wheel.

The rivet tapes 22, 26 have been cut such that ends 22a, 26a of the rivet tape are touching in the depicted embodiment. Each touching end of the rivet tape 22a, 26a includes opposite halves of sprocket holes, such that the two ends together form sprocket holes 27. In some embodiments there may be a separation between the ends 22a, 26a of the rivet tape. The separation between the ends of 22a, 26a of the rivet tapes 22, 26 is determined by the length of rivet tape which extends beyond the last hole 24c, 28c of each rivet tape. This length may be sufficiently long that the hole 24c, 28c is not weakened to such an extent that the rivet tape rips and the hole is opened. Even if a rip were to open a hole, because the clip 2 includes a projection which engages with a hole 24a, 28a that is separated from the endmost hole of the rivet tape 24c, 28a, such a rip won't propagate to the other engaged hole and thus the rivet tape will remain secured to the clip 2.

In some instances it may be difficult to achieve touching ends of the rivet tape 22a, 26a with opposite halves of sprocket holes such that the two ends together form sprocket holes 27. In other embodiments, depicted further below, a non-straight cut of the tape is used which removes sprocket holes at the point where the rivet tapes meet.

Adhesive may be provided between the clip 2 and the rivet tapes 22, 26.

In use, the clip 2 is used to join together first and second spools of rivet tape 22, 26. When all or most of the rivets held by a rivet tape 22 have been used, the clip 2 may be used to join that rivet tape 22 to a new rivet tape 26. Conventionally, a spool of rivet tape will include a portion of rivet tape without rivets at its innermost end, in order to allow all of the rivets on the rivet tape to pass through a rivet insertion tool whilst the end of the rivet tape remains fixed to a reel. When most of the rivets on a rivet tape 22 have been used (e.g. as detected by a sensor), the rivet tape may be cut such that three (or more than three) empty holes are present at the end of the rivet tape. A new spool of rivet tape 26 may be provided on a reel. The new spool of rivet tape 26 includes at least three holes at its end which do not hold rivets. Projections 10c,d of the clip 2 are pressed into the holes 28a-c at the end of the new rivet tape 26, thereby fastening the clip to the rivet tape. Fastening the clip 2 to the new rivet tape 26 may, for example, be performed manually when the new rivet tape is in a location which is outside of the operating environment of the rivet insertion tool (e.g. in a storage area).

The new spool of rivet tape 26 with the clip 2 fastened to its end is transported to the vicinity of a rivet insertion tool being fed by rivet tape 22 which has almost run out of rivets (referred to here as the old rivet tape 22). The end of the new rivet tape 26 is drawn off the reel and is extended to meet the end of the old rivet tape 22. The projections 10a,b of the clip 2 are pressed into empty holes at the end of the old rivet tape 22, thereby fastening the clip 2 to the old rivet tape. In this way the new rivet tape 26 and the old rivet tape 22 are joined together. This process may be performed manually. Alternatively, as described further below, the process may be performed in an automated manner.

An alternative use of the clip 2 comprises joining together partially used lengths of rivet tape. In a factory environment it may be desirable to replace rivet tapes for a plurality of rivet insertion tools at the same time, in order to minimise production downtime. Where this is done, some partially used rivet tapes will be removed. Clips according to an embodiment of the invention may be used to fasten together lengths of partially used rivet tape which still hold rivets. In this way, a full length of rivet tape may be assembled using two or more partially used lengths of rivet tape. The assembled full length of rivet tape can then be used for rivet insertion. The configuration of the clip 2 is such that it can pass unhindered through a nose and feed mechanism of a rivet insertion tool (as described further below) and through a motor-driven sprocket wheel (described below). Thus, the presence of one or more clips partway along the rivet tape does not affect the usability of the rivet tape by a rivet insertion tool.

Clips according to other embodiments of the invention are now described. The clips may be used in the same way as described above.

Figure 4A:
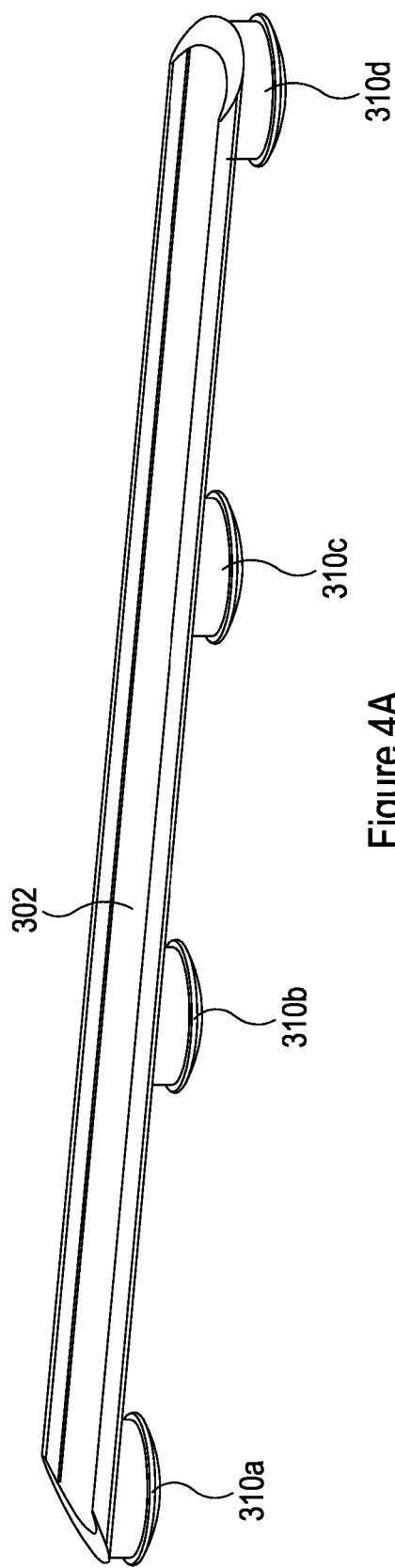
Figure 4B:
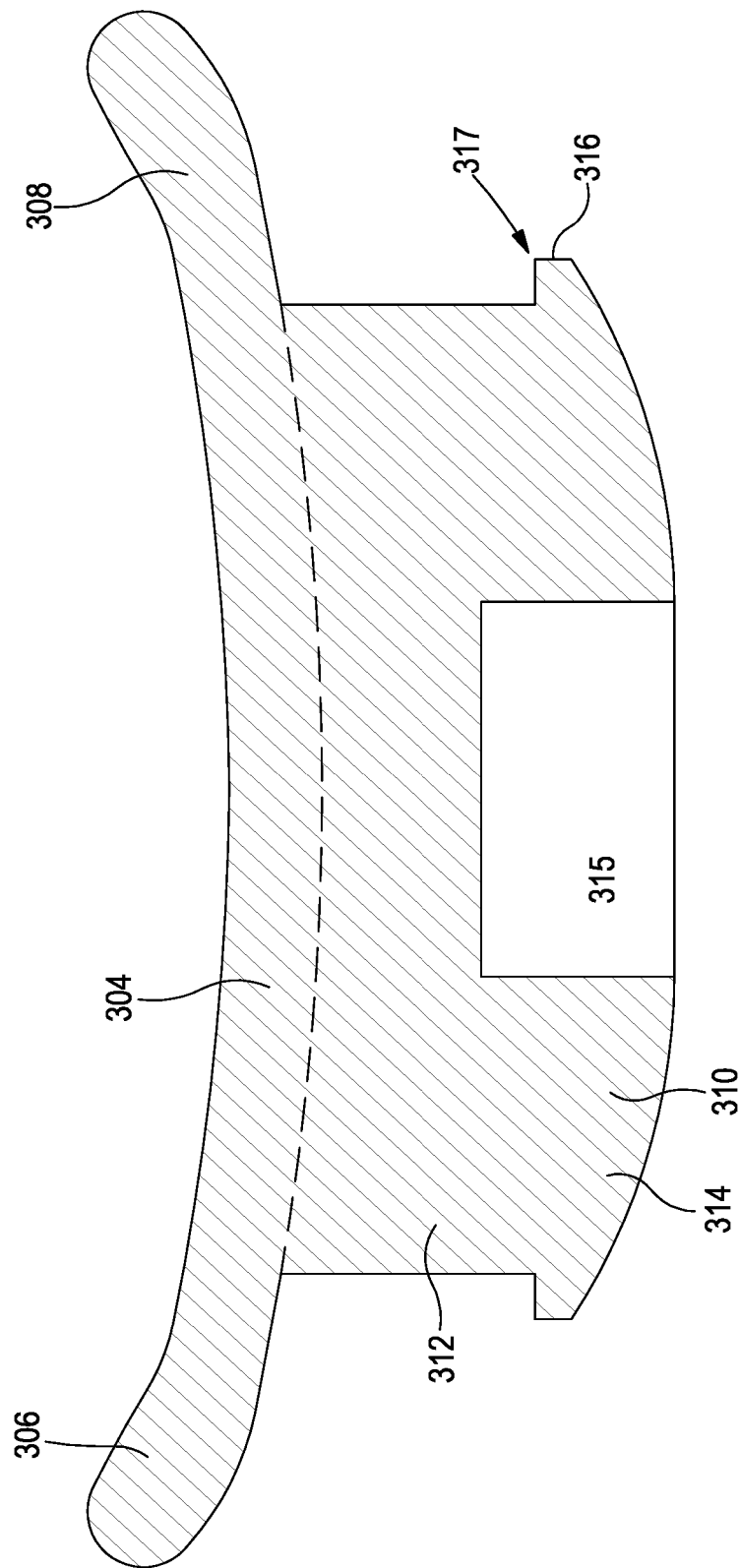
Figure 4D:
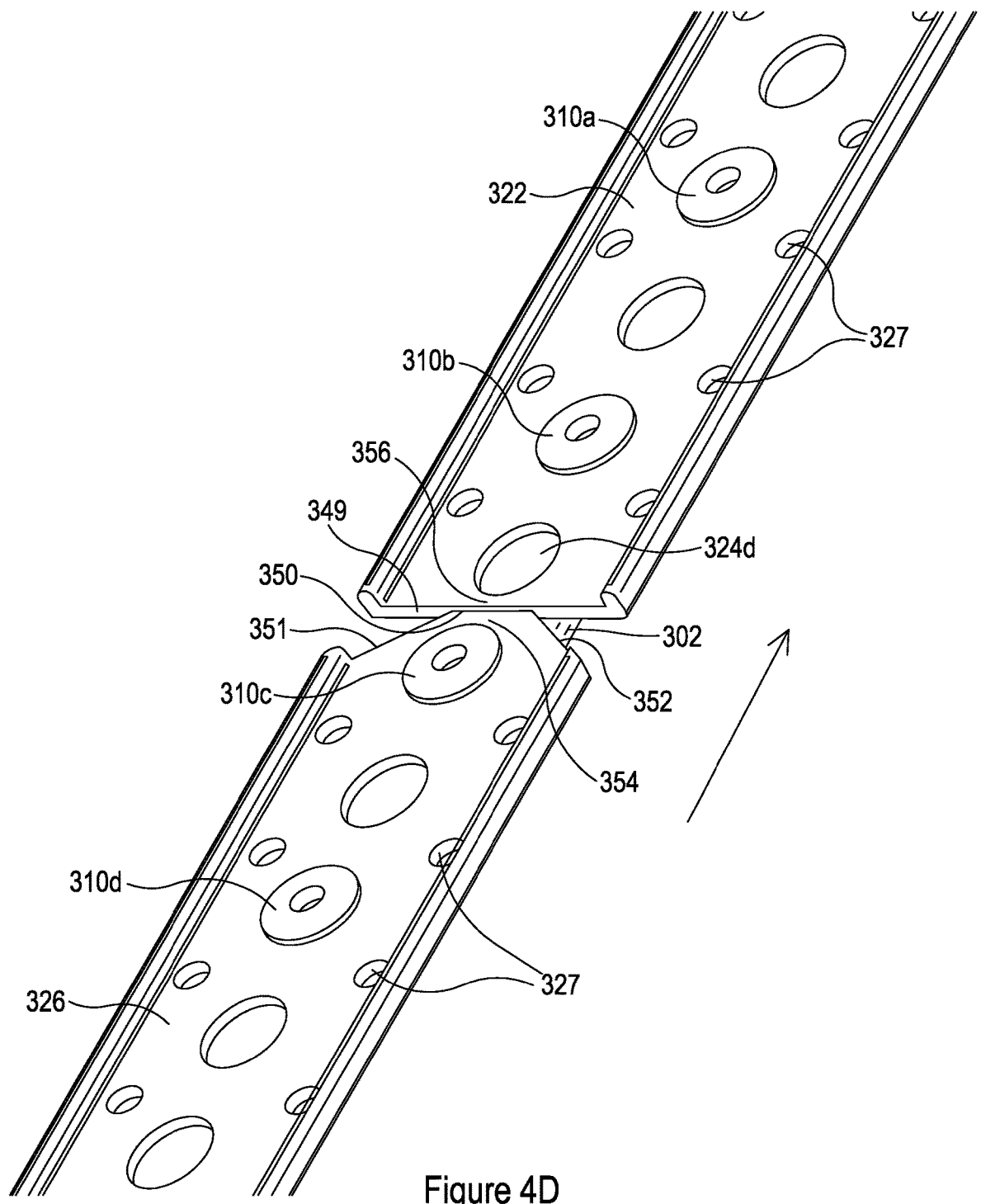

FIG. 4 depicts a clip 302 according to an alternative embodiment of the invention. The clip 302 is depicted in perspective view in FIG. 4A, in a first cross section in FIG. 4B and in a second cross section FIG. 4C. FIG. 4C also depicts rivet tapes 322, 326 which have been fastened to the clip 302. FIG. 4D is a perspective view from underneath of the rivet tapes 322, 326 attached to the clip 302.

Figure 1B:
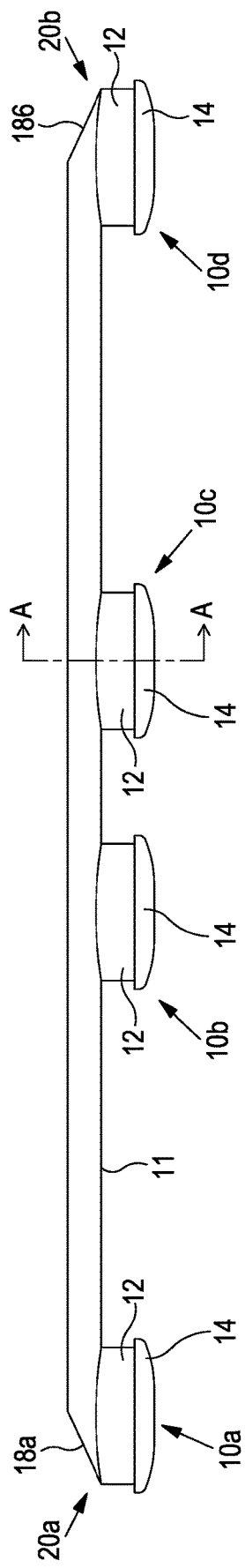
Figure 1C:
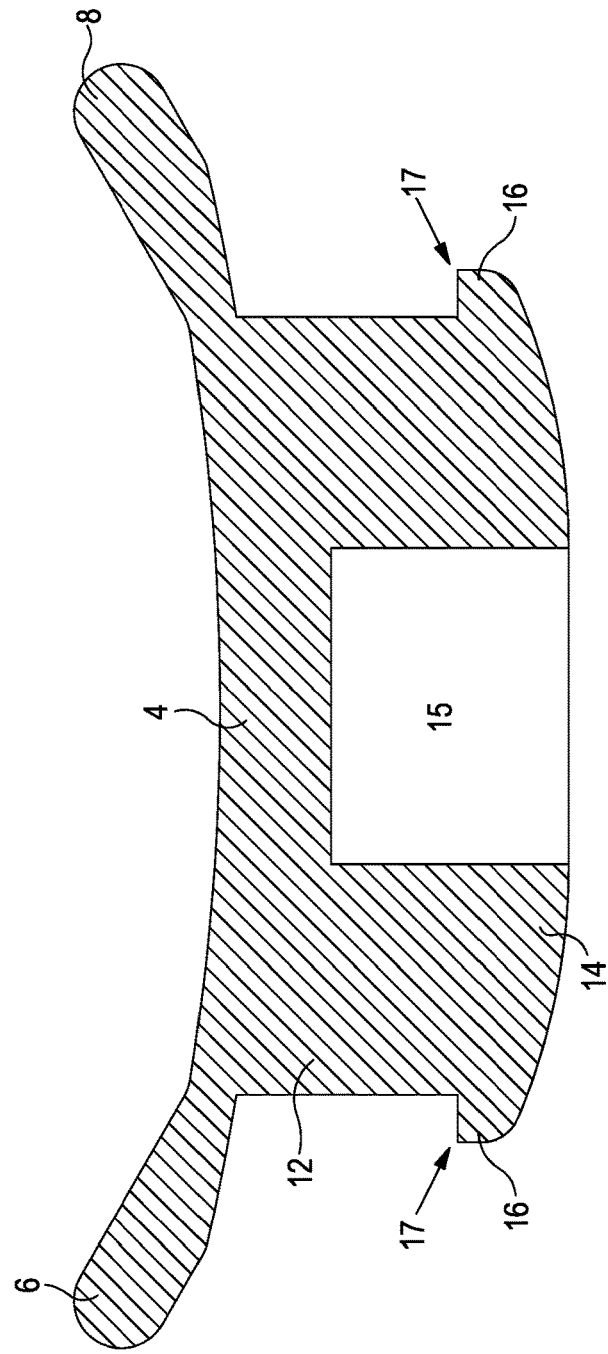

The clip 302 is broadly similar to the clip 2 depicted in FIGS. 1-3, in that it consists of four projections 310a-d which extend from a bottom surface of the clip. The clip 302 is elongate and again comprises a central portion 304 and first and second side portions 306, 308 which are thicker than the central portion. The central portion 304 may be sufficiently thin to allow it to pass beneath a switch in a nose of a rivet insertion tool without triggering that switch (as described elsewhere in this document). The central portion 304 may not, on its own, be sufficiently strong to give the clip a desired tensile strength. The side portions 306, 308 give the clip additional tensile strength 302. The clip 302 may be sufficiently strong that it stretches by only around 1 mm (or less) when rivet tape is being pulled through a rivet insertion tool using the clip. The central portion 304 of the clip depicted in FIG. 4 is thicker than the central portion 4 of the clip depicted in FIG. 1. This may increase the tensile strength of the clip 304. The thickness of the central portion 304 of the clip in FIG. 4 may for example be around 0.5 mm (±0.05 mm). In general, dimensions mentioned here and elsewhere in this document may have a tolerance of ±0.05 mm. Thus, for example, the central portion 304 may have a thickness of between 0.45 mm and 0.55 mm.

The four projections 310a-d of the clip 302 have the same overall shape as the projections of the clip depicted in FIGS. 1-3. However, some dimensions of the projections are different. Each projection 310 comprises an inner portion 312 and an outer portion 314. The inner portion 312 of each projection 310 is connected to the central portion 304 of the clip 302. The outer portion 314 of each projection is connected to the inner portion 312 and includes a lip 316. Each projection includes a blind bore 315 which extends fully through the outer portion 314 and part way into the inner portion 312. The clip 302 may be formed using injection moulding. The blind bores 315 in the projections advantageously reduce distortion of the projections which may be caused by the injection moulding process.

The lip 316 extends around the circumference of each projection 310, and projects laterally such that the diameter of the outer portion 314 is greater than a diameter of the inner portion 312. An outer edge of the outer portion 314 has a sharp corner 317 (e.g. a corner which does not include significant rounding). The sharp corner 317 may help to retain rivet tape on the clip 302 as explained elsewhere in this document. A bottom end of the outer portion 314 is convex and is curved. The bottom end may have a constant radius of curvature. The curved form of the bottom end of the outer portion 314 may help the projection 310 to pass into a rivet tape hole as explained elsewhere in this document.

Each projection 310 may for example have a length of around 1.8 mm. This is shorter than the projections 10 of the clip 2 depicted in FIGS. 1-3. As noted further above, the thickness of the central portion 304 is greater than the thickness of the central portion 4 of the embodiment depicted in FIGS. 1-3. Thus, the central portion 304 is thicker but the projection 310 is shorter. The combination of the central portion 304 and the projection 310 taken together provides the same total thickness as the embodiment depicted in FIGS. 1-3. In other words, the thickness as measured from the middle of the central portion 304 to the bottom of the projection 310 is the same as for other embodiments of the clip. This thickness is 2.3 mm in the depicted embodiments. In general, the thickness may be around 2 mm or more. The thickness may be sufficiently big to avoid excessive longitudinal stretching during use, but sufficiently small to allow the clip to pass easily through a nose of a rivet insertion tool.

As may be seen in FIG. 4C, the projections 310a-d are sufficiently long to pass through the tape 322, 326. Thus, shortening the projections in order to allow the central portion 304 to be thickened without increasing the overall thickness of the clip advantageously improves the tensile strength of the clip 302 whilst still allowing the clip to be securely fastened to the rivet tapes 322, 326.

The inner portion 312 of each projection may for example have a length of around 1.1 mm. The outer portion 314 of each projection may for example have a length of around 0.7 mm. The blind bore 315 may for example have a length of around 1.0 mm. The inner portion 312 of each projection may for example have a diameter of around 5.0 mm. The outer portion 314 of each projection may for example have a diameter of around 5.5 mm. The blind bore 315 may for example have a diameter of around 2 mm.

The bottom end of each outer portion 314 may for example have a radius of curvature of around 3.4 mm. The radius of curvature may be continuous to an outer edge of each lip 316 (unlike the embodiment depicted in FIGS. 1-3). The bottom surface may have a single radius of curvature or may comprise a compound curve with more than one radius of curvature. In general, a convex curve is desirable at the bottom of the projection 310, for this and other embodiments, in order to encourage rivet tape to slide over the projection when the projection is inserted into a hole in the rivet tape.

In general, each projection 310 may have a length of around 1.5 mm or more. This may be sufficiently long to securely engage a rivet tape. The same may apply for other embodiments of the clip.

In the embodiment depicted in FIGS. 1-3, the separation between a middle pair of projections 10b and 10c was half of the separation between those projections and distal projections 10a and 10d. In the embodiment depicted in FIG. 4 this is not the case. Instead, separation between each of the projection 310a-d is almost equal, although with a slightly smaller separation between a central pair of projections 310b, 310c (e.g. smaller by around 5%). This slightly smaller separation is to accommodate a small degree of stretching of the clip 312 as explained further below.

As is explained elsewhere in this document, it is desirable that the clip allows tape to be fed through a rivet insertion tool without engaging a switch of the tool or becoming trapped in the tool, etc. In the embodiment depicted in FIGS. 1-3, this was achieved by engaging the outermost holes of the rivet tapes. However, in the alternative embodiment of FIG. 4, the outermost hole 324d of one of the tapes 322 being joined is not engaged by the clip 302. An arrow in FIG. 4C depicts the direction of travel of the rivet tapes 322, 326 into the rivet insertion tool. It can be seen that the outermost hole 324d which is not engaged by the clip 302 is at the tail end of a tape 322 which is being joined to the leading end of another tape 326. For ease of terminology these rivet tapes are referred to herein as the old rivet tape 322 and the new rivet tape 326. Because the old rivet tape 322 is fed first into the rivet insertion tool, some flexing of the tape 322 away from the clip 302 as it passes through a nose of a rivet insertion tool (see for example FIG. 6A) may occur without the rivet tape becoming trapped in the nose of the rivet insertion tool. If the first hole of the new tape 326 was not engaged by the clip 302, then flexing of the tape away from the clip as it passed into the nose of the rivet insertion tool would result in a leading edge of the tape becoming trapped in the nose. Realising that the final hole 324d of the old rivet tape 322 does not need to be engaged by the clip 302 allows some flexibility in the design of the clip, and this in turn has been used to improve the performance of the clip, as is explained below.

The separation between first and second projections 310a,b is around 18 mm (measured between the centres of the projections). This corresponds with the separation between holes 324 of the rivet tapes 322, 326 (measured between the centres of the holes). Similarly, the separation between the third and fourth projections 310c,d of the clip 302 is around 18 mm. The separation between the second and third projections 310b,c of the clip 302 is around 17 mm. During use of the clip 302, force applied to the clip 310 when rivet tape is being drawn through a rivet insertion tool causes some stretching of the clip 302. As a result of this force a middle portion of the clip 302 will stretch by around 1 mm. Consequently, in use, the separation between the second and third projections 310b,c is around 18 mm. This is the same as the separation between the first and second projections 310a,b and the third and fourth projections 310c,d. Consequently, in use, the sprocket holes 327 of the old and new tapes 322, 326 align correctly with sprocket wheels of the rivet insertion tool.

In general, a clip according to an embodiment of the invention may include a pair of projections with a separation that is smaller than the separation between other projections (or smaller than a multiple of the separation between other projections). The difference in separations may correspond with stretching that occurs between the pair of projections when the clip is used. The difference in separations may for example be up to around 2 mm. The difference in separations may be around 1 mm.

The manner in which the rivet tapes 322, 326 are cut and engaged with the clip 302 is now described in detail with reference to FIG. 4D. The direction of travel of the rivet tape is indicated by an arrow in FIG. 4D. It can be seen that the old rivet tape 322 has a single cut 349 which is transverse to the tape. This may be referred to as a square cut. However, the new rivet tape 326 does not have a single cut transverse to the tape. The new rivet tape 326 instead has a three-sided cut. The three-sided cut comprises a square portion 350, a first angled portion 351 and a second angled portion 352. The square portion 350 of the cut is towards the centre of the tape 326 with the angled portions 351, 352 on either side. Thus, 90° corners of the new rivet tape 326 which would otherwise be present are not present. The square portion 350 of the three-sided cut is transverse to the tape. The angled portions of the cut 351, 352 may subtend an angle of 20° or more relative to the central portion 350, and may for example subtend an angle of 30° or more relative to the central portion.

Providing angled portions 351, 352 is advantageous because this reduces the likelihood of corners of the rivet tape engaging with the nose of the rivet insertion tool and becoming trapped in the rivet insertion tool. The greater the angle subtended by the angled portion 351, 352 the more the risk of the tape becoming trapped in the nose of the rivet insertion tool is reduced. However, increasing the angle of the angled portion 351, 352 reduces the amount of rivet tape 326 around the third projection 310c of the clip 302. If the material were to be reduced too much then there would be a tendency for the tape 326 around the third projection 310c to break when force is applied to the tape 326 to pull it through a rivet insertion tool. It has been found that an angle of 20° or more advantageously reduces the likelihood of the new tape 326 becoming trapped whilst still providing sufficient tape strength. It has been found that an angle of 30° or more further reduces the likelihood of the new tape 326 become trapped whilst still providing sufficient tape strength. In the depicted embodiment the angle is around 38°, and this advantageously provides a good combination of reduced or eliminated trapping of the tape whilst at the same time retaining sufficient tape strength.

The positions at which the old tape 322 and the new tape 326 are cut, with respect to the positions of the holes 324 in the tapes may be selected to provide good tape strength and also to accommodate for stretching of the clip 302 during use (e.g. stretching of around 1 mm). Referring first to the old tape 322, the old tape is not cut midway between the last hole 324d and the next opening. Instead, the cut is provided upstream of the next sprocket holes. The area or land 356 behind the last hole 324d is reduced (compared with the case if the cut was equidistant between holes in the tape). In contrast, the new tape 326 has a square portion 350 cut which is upstream of a midpoint between the first hole 324e and the preceding hole (not present once the cut has been made). This increases the area or land 354 of the new tape 326 in front of the projection 310c. In general, by cutting the new tape 326 upstream of a point equidistant between holes 324, the new tape 326 is given strength over and above the strength that it would have if an equidistant cut were made. The angled portions 351, 352 of the cut remove the portion of the new tape 326 which bears the sprocket holes 327 at the leading edge of the tape. Thus, a space is present where sprocket holes would otherwise be located.

The additional land 354 at the leading end of the new tape 326 is provided at the expense of land which is lost from the trailing edge of the old tape 322. The narrow land 356 at the end of the old tape 322 is such that it may not be strong enough to avoid stretching when force is applied via the clip 302 to the old tape 322 to pull it through the rivet insertion tool. For this reason, the projections 310a,b do not pass through this hole 324d, and instead pass through other holes. This avoids tensile force breaking the hole 324d at the distal end of the old tape 322. As explained further above, because this is a trailing edge of the old tape it does not become trapped in the nose of the rivet insertion tool.

The combined length of the land 354 at the front of a new tape and land 356 at the back of the old tape 322 may be less than the land between adjacent holes 324 of either of the tapes. For example, the combined lands 354, 356 may be around 1 mm shorter (or more than 1 mm shorter). This allows the old and new rivet tapes 322, 326 to be connected together with a separation between the final hole 324d of the old tape and the first hole 324e of the new tape being around 1 mm less than the separation between holes of either tape. This advantageously accommodates a stretching of around 1 mm of the clip 302 during operation. When this stretching occurs, the separation between the sprocket holes 327 is as desired by the rivet insertion tool (e.g. a separation of around 18 mm).

Parts of the clip of FIG. 4 which are not described above, such as the tapered ends, may be the same or similar to the corresponding parts of the clip of FIGS. 1-3. The clip 302 is formed from resilient material. The clip 302 may be formed from plastic, for example nylon 66.

Figure 5B:
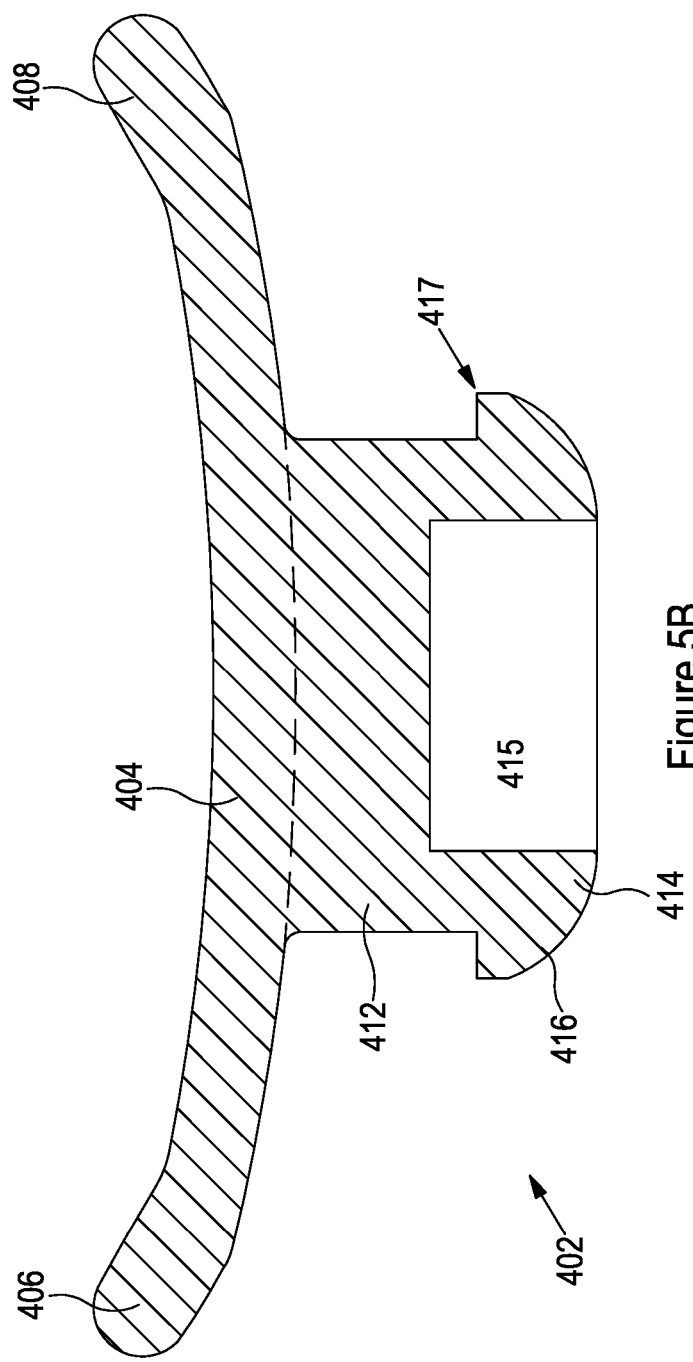
Figure 5C:
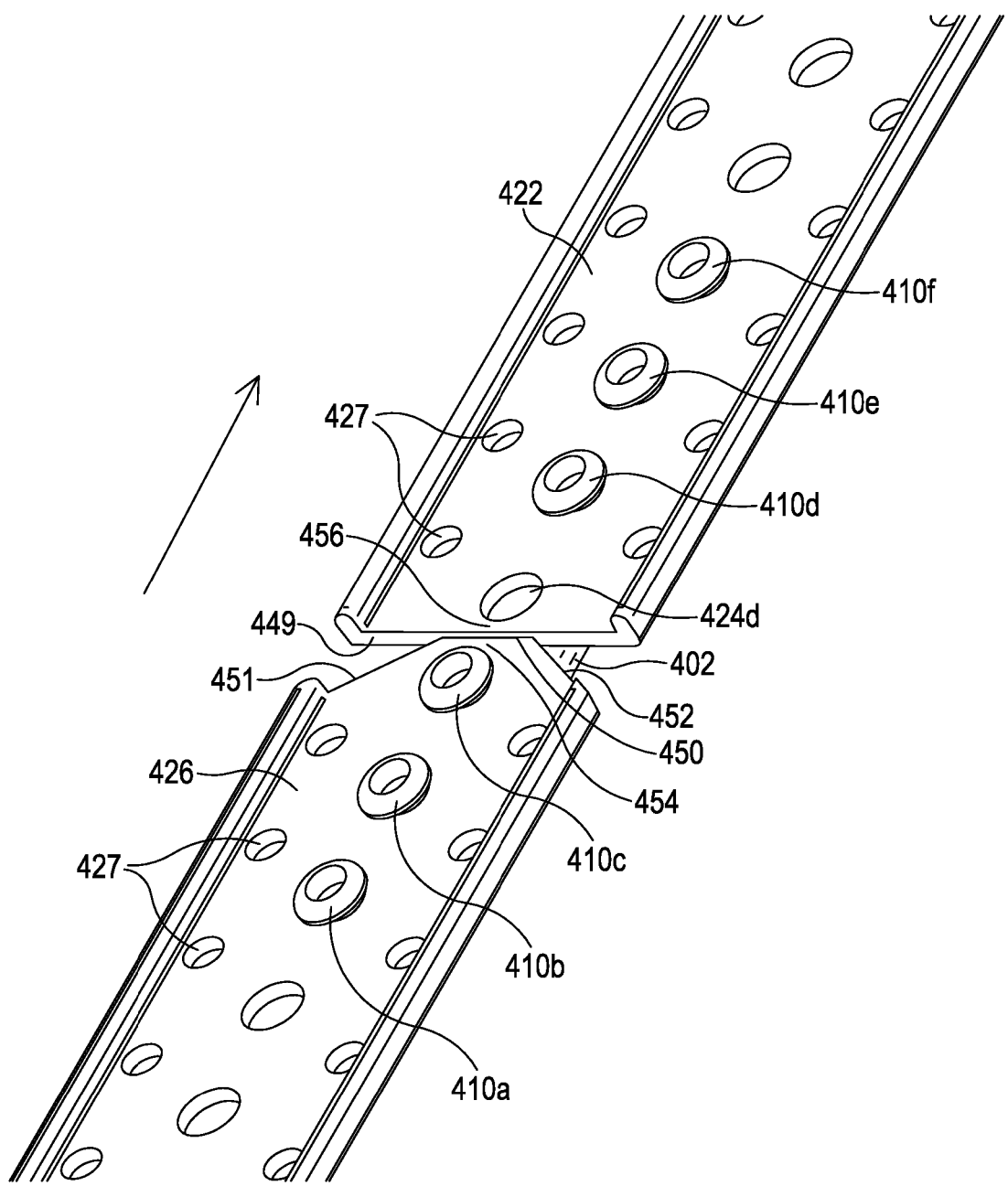

A further embodiment of the clip is depicted in FIG. 5. FIG. 5 depicts a clip 402 according to an alternative embodiment of the invention. The clip 402 is depicted in a first cross section in FIG. 5A together with rivet tapes 422, 426, and in a second cross section FIG. 5B. FIG. 5C is a perspective view from underneath of the rivet tapes 422, 426 attached to the clip 402.

The embodiments depicted in FIGS. 1-4 are configured to engage rivet tape which holds rivets having a 5 mm shank diameter (which may be referred to as 5 mm rivets). The holes in the rivet tape are around 5 mm in diameter and the projections 10a-d, 310a-d of the clip 2, 302 depicted in FIGS. 1-4 are dimensioned accordingly. These clips may be referred to as 5 mm clips. The embodiment depicted in FIG. 5 is configured to engage rivet tape which holds rivets with 3 mm shank diameters (which may be referred to as 3 mm rivets). The clip 402 has projections 410a-f which are dimensioned accordingly. These may be referred to as 3 mm clips. The rivet tapes may be referred to as 3 mm rivet tapes.

The clip 402 is elongate, and the central portion 404 and first and second side portions 406, 408 are the same as for the embodiment depicted in FIG. 4. The projections 410a-f have the same length, the same length of blind bore, etc. The projections 410 include laterally projecting lips 416. However, the inner portion 412 of each projection has a diameter of around 3 mm instead of a diameter of around 5 mm, and the outer portion 14 of each projection has a diameter of around 3.5 mm instead of a diameter of around 5.5 mm. The radius of curvature of the bottom of the outer portion 414 is increased to around 0.85. These changes of dimension and radius of curvature allow the clip 414 to engage with rivet tape holes 424a-f which have a diameter of around 3 mm.

The clip 412 is provided with six projections 410a-f instead of four projections. This is to provide more engagement between the clip 402 and the tape in order to reduce the risk of a poor connection between the clip and a rivet tape. A poor connection might occur if only two projections were engaged in a 3 mm rivet tape because the projections are narrower and the tape will tend to stretch around the projections. If a poor connection were to occur and the tape were to stretch in this manner, then the separation between sprocket holes of the tape would increase and the tape would become jammed at a sprocket wheel of the rivet insertion tool. Engaging three projections with the rivet tape reduces the risk of this occurring.

It is noted further above in connection with 5 mm clips that engaging two projections with the rivet tape is preferred over engaging three projections with the rivet tape, because more force is required in order to engage three projections with the rivet tape. However, in the case of 3 mm clips, the disadvantage of needing to apply more force to engage the clip and tape is outweighed by the advantage of avoiding a poor connection.

FIG. 5C depicts the clip 402 engaged with old rivet tape 422 and new rivet tape 426. In common with the embodiment described above in connection with FIG. 4D, the old tape 422 is cut with a single cut 449, whereas the new tape 426 is cut with a three sided cut. The three-sided cut consists of a square portion 450, and first and second angled portions 451, 452. The angles of the angled portions 451, 452 may correspond with those described above in connection with FIG. 4. In general, the description of the cuts described above in connection with FIG. 4 may also apply for the present embodiment.

The separation between each of the first three projections 410a-c of the clip 402 is around 6.75 mm. This corresponds with the separation between holes 424 in the rivet tapes 422, 426. Similarly, the separation between each of the last three projections 410d-f of the clip 402 is around 6.75 mm. The separation between the two projections 410c,d at the middle of the clip 402 is around 12.5 mm. This is 1 mm shorter than twice the separation between other projections. As has been explained above in connection with the embodiment of FIG. 4, a separation which is around twice the separation between holes in the tape allows the trailing edge hole 424d of the old rivet tape 422 to remain open and not engaged by a projection. Although this allows the tape 422 to flex away from the clip 402 during use, because it is a trailing end of the tape it does not become trapped in the rivet insertion tool.

The clip 402 may stretch by around 1 mm during use, such that during use the separation between the innermost pair of projections 410c,d is around 13.5 mm. This is double the separation between holes of the rivet tape 422, 426 and thus allows sprocket holes 427 of the tape to be engaged correctly by the rivet insertion tool.

In common with the embodiment depicted in FIG. 4, additional land 454 is provided at the leading end of the new tape 426 at the expense of land which is lost from the trailing edge of the old tape 422. The combined length of the land 454 at the front of the new tape 326 and land 356 at the back of the old tape 322 may be less than the land between adjacent holes 424 of either of the tapes. For example, the combined lands 454, 456 may be around 1 mm shorter (or more than 1 mm shorter). This allows the old and new rivet tapes 422, 426 to be connected together with a separation between the final hole 424c of the old tape and the first hole 424d of the new tape being around 1 mm less than the separation between holes of either tape. This advantageously accommodates a stretching of around 1 mm of the clip 402 during operation. When this stretching occurs, the separation between the sprocket holes 427 is as desired by the rivet insertion tool (e.g. a separation of around 6.75 mm).

Parts of the clip of FIG. 5 which are not described above, such as the tapered ends, may be the same or similar to the corresponding parts of the clip of FIGS. 1-3. The clip 402 is formed from resilient material. The clip 402 may be formed from plastic, for example nylon 66.

The same colour material may be used for the 3 mm clip and the 5 mm clip. Where this is the case, providing the 3 mm clip with six projections and the 5 mm clip with four projections allows operators to easily distinguish between the two clips. It may be desirable to use the same colour material when making the 3 mm and 5 mm clips because this allows a single mould to be used (the mould comprising a cavity which forms 3 mm clips and a cavity which forms 5 mm clips). In general, providing different numbers of projections on clips for different sizes of rivet tapes allows the clips to be easily distinguished from each other. The 3 mm clip and the 5 mm clip may be made using different colour materials.

Clips according to embodiments of the invention may be used to join rivet tape which holds rivets having shank diameters other than 3 mm and 5 mm. The dimensions of the projections 10, 310, 410 may be scaled accordingly. The inner portion 12, 312, 412 of the projections may have a diameter which corresponds with the shank diameter of rivets held by the tape which is joined using the clip. The dimensions of the central portion 4, 304, 404 and the side portions 6, 306, 406, 8, 308, 408 may be unchanged if the dimensions of the nose of the rivet insertion tool which receives the rivet tape are unchanged. If the dimensions of the nose are changed then the dimensions of the central portion and side portions may also be changed (the dimensions being selected such that the clip will pass through the nose without engaging a switch or becoming trapped in the nose).

In illustrated embodiments of the invention the clip is provided with projections which have a lip that is configured to engage an opposite side of the rivet tape from the central portion of the clip. In an alternative embodiment (not illustrated), the lips may be omitted from the projections. The projections may be shorter. In such embodiments the clip may be secured to the tape using adhesive located between the clip and the tape.

Figure 6:
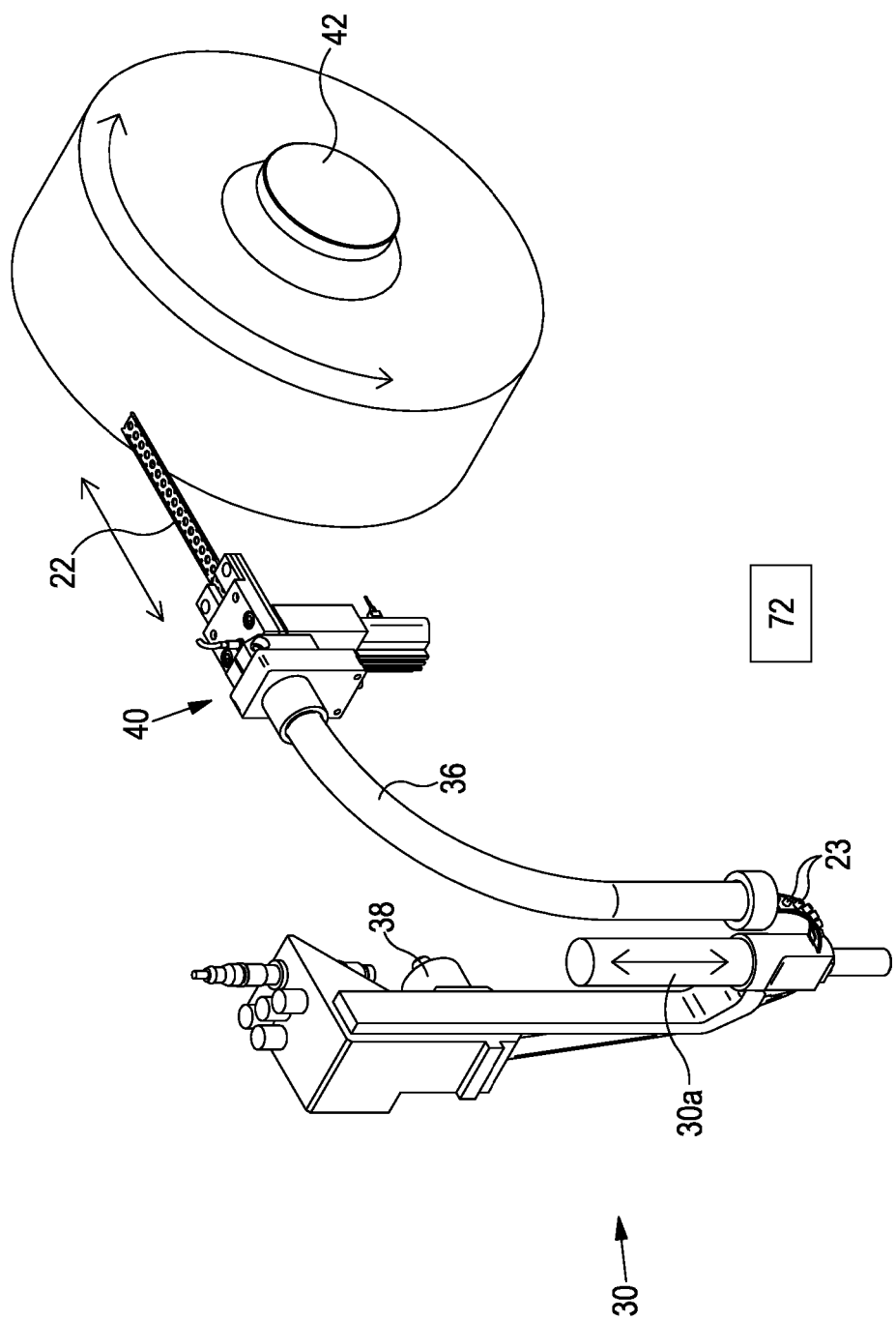
FIG. 6 depicts a rivet insertion tool, rivet tape, a rivet tape securing apparatus and a rivet tape reel.
Figure 7A:
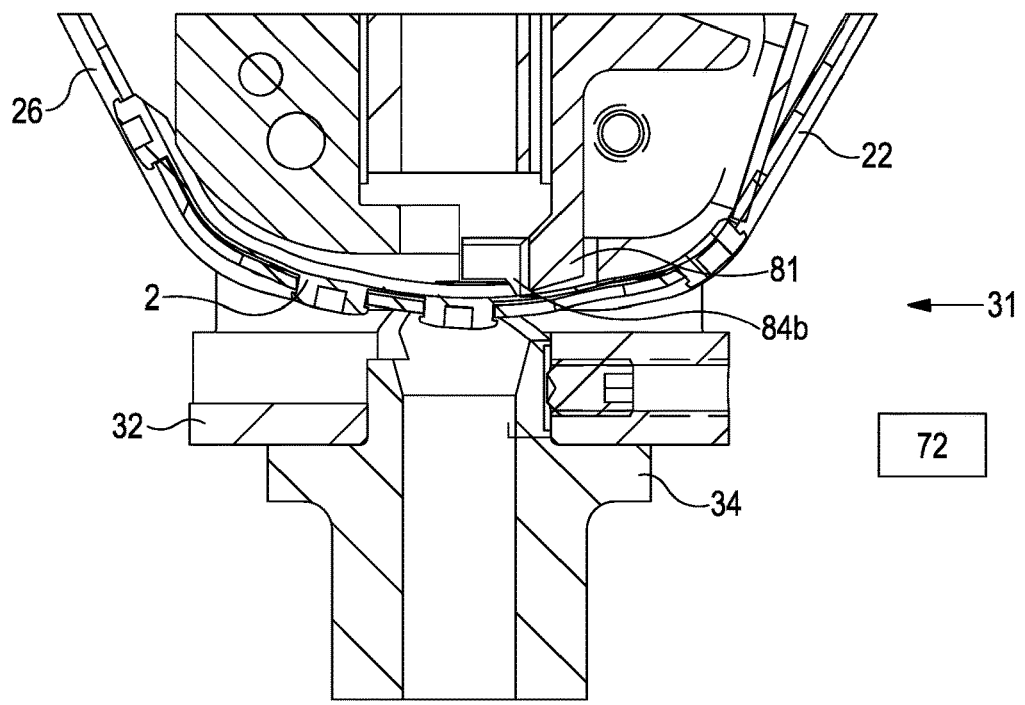
FIGS. 7A and 7B depict a nose of the rivet insertion tool together with the rivet tape and the clip.
Figure 7B:
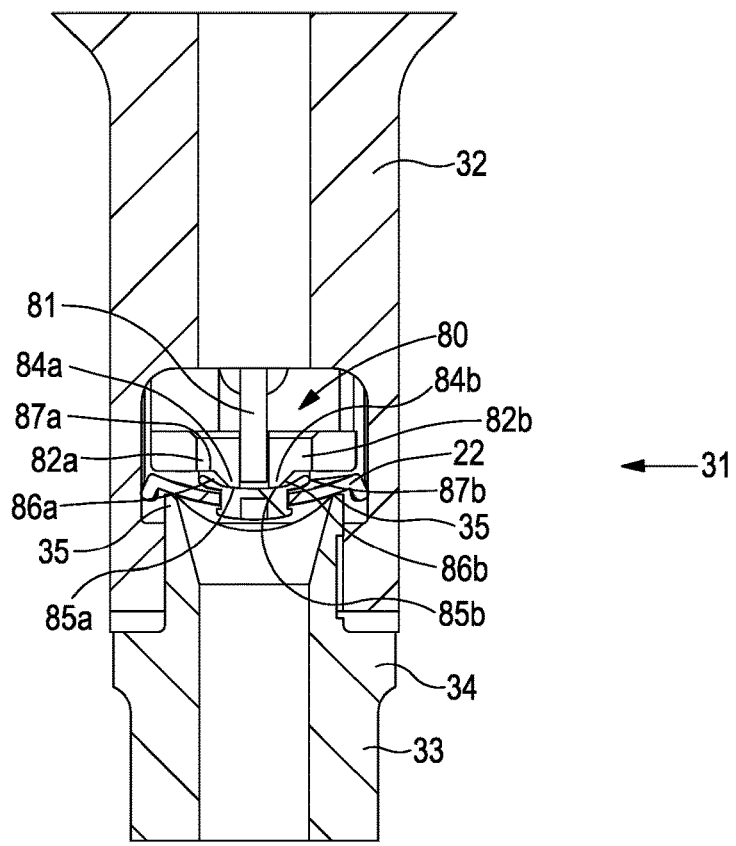

FIG. 6 depicts in perspective view a rivet insertion tool 30 (which may also be referred to as rivet insertion tooling) together with a rivet tape 22. FIGS. 7A and 7B depict in cross-section a nose 31 of the rivet insertion tool 30, with rivet tape 22, 26 and the clip 2 passing through the nose. FIGS. 5C and 5D are perspective views of the nose 31 with rivet tape 22 passing through the nose (a housing of the nose is omitted from these views). Referring first to FIG. 6, the rivet tape 22 is fed to the rivet insertion tool through a tube 36. The rivet tape 22 is drawn through the rivet insertion tool 30 by a sprocket wheel (not visible) driven by a motor 38 (e.g. a pneumatic motor). The positions of the tube 36 and the motor 38 are such that the rivet tapes 22, 26 and the clip 2 undergo a substantial degree of bending and twisting as they pass into and then pass out of the rivet insertion tool 30. This bending can be seen in FIG. 7A. Because the clip 2 is formed from resilient material it is able to bend and twist as needed when travelling into and out of the nose 31 of the rivet insertion tool 30.

Figure 7C:
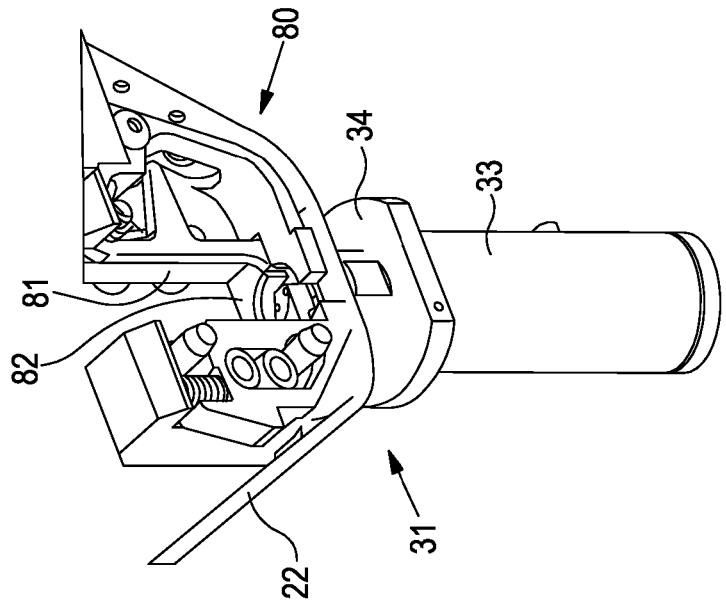
Figure 7D:
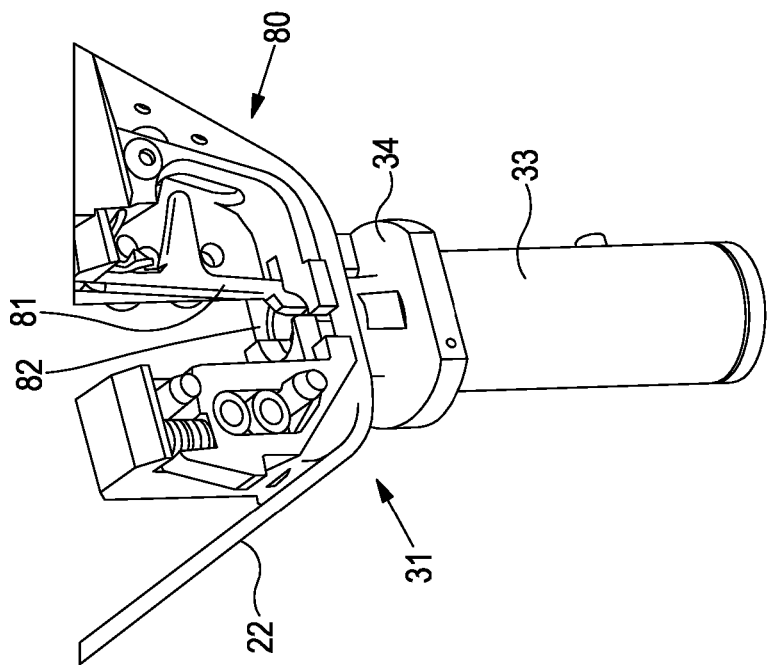

As can be seen from FIGS. 7A and 7B, there is a limited amount of space within the nose 31 of the rivet insertion tool. A sensor 80 is provided in the nose 31, the sensor comprising a finger 81 which extends downwards towards the rivet tape 22. The finger 81 is most easily seen in FIGS. 7C and 7D. The finger 81 is pivotally mounted at an upper end and is biased such that it enters a semi-circular opening defined by a rivet receiving member 82, as depicted in FIG. 7C. During operation of the rivet insertion tool 30, when a rivet enters the nose 31 it travels as far as the rivet receiving member 82 and is then prevented from travelling any further by an inner semi-circular wall of the rivet receiving member. The rivet pushes the finger 81 out of the semi-circular opening, as depicted in FIG. 7D (although the rivet is omitted in order to allow the finger to be seen more clearly). This movement actuates a switch (not depicted) of the sensor 80 which outputs a signal to a control system 72 indicating that a rivet is present in the nose 31. The controller 72 then causes the rivet insertion tool 30 to punch the rivet out of the nose and into a workpiece.

The rivet receiving member 82 is formed from two portions 82a,b. Referring to FIGS. 7A and 7B, each portion 82a,b of the rivet receiving member 82 has a lowermost surface which is configured to guide rivet tape downwards, thereby helping to keep the rivet tape away from the rivet sensor 80. These lowermost surfaces when viewed from the side include tapering downwardly projecting portions 84a,b. The taper is on a side of the projecting portions 84a,b which receives rivet tape 22 as it passes through the nose 31. The taper thus helps to push the rivet tape 22 downwards, flattening the rivet tape, as it passes through the nose 31. When viewed from the front, the downwardly projecting portions 84a,b have flat inner sections 85a,b, have faces 86a,b which taper outwardly and upwards from the flat inner sections, and have flat outer sections 87a,b. This configuration, which may be referred to as lateral tapering, also helps to keep the rivet tape 22 away from the sensor 80.

The nose 31 of the rivet insertion tool 30 comprises a housing 32 which holds the sensor 80, and a tube 33 which extends downwardly from the housing. The tube 33 may for example be pushed into the housing 32 until a flange 34 of the tube contacts the housing 32, and then secured to the housing. Uppermost ends 35 of the tube 33 provide support surfaces which support a bottom surface of the rivet tape 22 as it passes through the nose 31.

The uppermost ends 35 of the tube 33 together with the rivet receiving member 82 define a restricted space through which the rivet tape 22 must pass. The clip 2 must also pass through this restricted space. As may be seen from FIG. 7A, the lateral tapering of the lowermost surface of the rivet receiving member is such that a central part of the space is more restricted, with more space being available either side of the central part of the space. As noted further above, the side portions 6,8 of the clip 2 are thicker than the central portion 4 of the clip. The thicker side portions 6,8 pass through the available space either side of the central part of the space in FIG. 7A. The central portion 4 of the clip 2 passes through the more restricted central part of the space. In other words, the central portion 4 of the clip passes beneath the flat inner sections 85a,b, of the rivet receiving member 82, and at least part of the side portions 6,8 of the clip passes beneath the flat outer sections 87a,b of the rivet receiving member. The central portion 4 of the clip 2 may for example have a thickness of less than 0.4 mm (e.g. a thickness of around 0.3 mm). In general, the clip 2 is configured to pass through the space available within the nose 31.

When rivet tape 22, 26 is fed through the nose 31 of the rivet insertion tool 30, the clip 2 passes under rivet receiving member 82. The clip 2 does not enter the semi-circular opening defined by the rivet receiving member 82 and does not push the finger 81 out of the semi-circular opening. The finger 81 therefore does not cause the sensor 80 to output a signal indicating that a rivet is present. The tapered face 18b of the clip 2 helps the clip to pass smoothly under the rivet receiving member 82, and avoids the clip becoming caught against the semi-circular wall of the rivet receiving member.

When the clip is passing through the nose 31, the sensor 80 does not provide an output signal indicating that a rivet is present. Operation of the punch of the rivet tool is therefore suspended. The motor 38 (see FIG. 6) pulls the rivet tape 22 and thus pulls the clip 2 through the nose 31. The motor 38 continues to pull the rivet tape 22 and new rivet tape 26 through the nose 31 until a rivet enters the rivet receiving member 82 and the rivet is detected by the sensor 80. The motor 38 then stops and the rivet is driven into a workpiece by the actuator of the riveting tool. The motor then moves again until the next rivet is detected, etc.

Figure 8A:
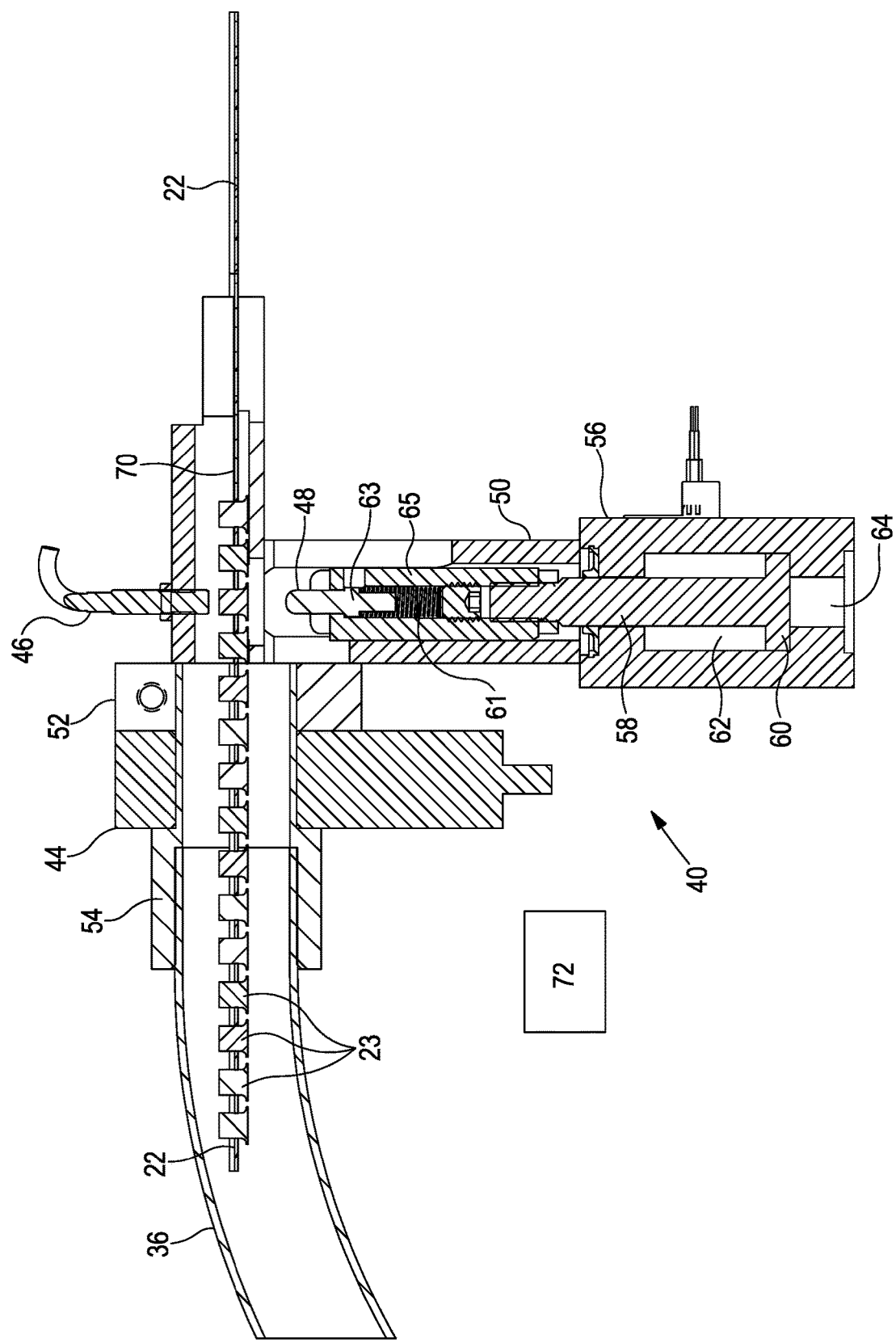

In addition to the rivet insertion tool 30, tube 36 and motor 38, FIG. 6 also depicts a rivet tape securing apparatus 40 and a reel 42 which supports a spool of rivet tape 22. The rivet insertion tool 30, tube 36, motor 38, rivet tape securing apparatus 40 and reel 42 may all be mounted on a robot arm (not depicted). The rivet tape 22 has been almost completely used up, and is referred to here as old rivet tape. Rivets 23 are present in the rivet tape in the vicinity of the rivet insertion tool 30 but no rivets are present in the vicinity of the reel 42. FIG. 8A depicts in cross-section the rivet tape securing apparatus 40 together with part of the tube 36 and the old rivet tape 22. For ease of illustration the old rivet tape 22 is depicted as terminating part way into the tube 36, whereas in practice the rivet tape will extend fully through the tube as depicted in FIG. 6.

The rivet tape securing apparatus 40 comprises first and second sensors 44, 46 and a movable pin 48. In the depicted embodiment the second sensor 46 and the movable pin 48 are both connected to a housing 50. The housing 50 is connected to a support 52. An end piece 54 fitted to the tube 36 is also connected to the support 52. The first sensor 44 is an inductive ring sensor which is fitted over the tube end piece 54. The tube end piece 54 is formed from plastic (e.g. Nylon 66) and thus allows the inductive ring sensor 44 to sense the presence of rivets through the tube end piece.

The movable pin 48 is actuated by a pneumatic actuator 56. The pneumatic actuator 56 comprises a rod 58 which extends from a piston 60 in a chamber 62. A helical spring 61 extends between the rod 58 and the moveable pin 48, and engages against a collar 63 formed partway along the length of the moveable pin. The moveable pin is held in a tube 65 which is fixed to the rod 58 (e.g. via a screw-thread on an inner surface of the tube 65 which engages with a screw thread on an outer surface of the rod). The moveable pin 48 is free to move up and down within the tube 65. The moveable pin 48 is prevented from moving out of the tube 65 by a lip which projects radially inwards at the top of the tube and engages against the collar 63. The helical spring 61 biases the moveable pin 48 towards the top of the tube 65.

A source of air pressure (not depicted) is connected to an inlet 64 of the chamber 62 below the piston 60, such that when pressurised air is provided from the supply it pushes the piston 60 into the chamber 62. FIG. 8B depicts the piston 60 after it has moved into the chamber 62. As may be seen, the rod 58 and the tube 65 move upwards towards the rive tape 22. The moveable pin 48 also moves upwards but is prevented by a rivet 23 from moving through the same distance as the rod 58 and tube 65. Once the pin 48 has stopped moving upwards, the continued upward movement of the tube 65 compresses the helical spring 61. The helical spring 61 thereby biases the moveable pin 48 against the rivet 23.

In use, the inductive sensor 44 senses rivets 23 held on the rivet tape 22 as the rivets pass through the inductive sensor. Referring to FIG. 6, the rivet insertion tool 30 moves upwards and downwards as indicated by the arrow 31a during rivet insertion. The reel 42 is spring-loaded with a bias to rotate in the anti-clockwise direction (although it may be spring-loaded with a bias to rotate in the clockwise direction). When a rivet is inserted into a workpiece, the moving parts of the rivet insertion tool 30 move downwards towards the workpiece. This draws the rivet tape 22 through the tube 36 and thus unwinds some rivet tape from the spool held by the reel 42. After a rivet has been inserted the rivet insertion tool 30 returns to its previous position (moving upwards in FIG. 6). This introduces slack into the rivet tape 22, and the rivet tape is wound back onto the spool via the spring-loading of the reel 42. This movement of the rivet tape is repeated for each rivet insertion. Referring to FIG. 8A, the first empty hole 70 of the rivet tape 22 may be seen. During rivet insertion the rivet tape is pulled to the left (in FIG. 8A), and following rivet insertion the rivet tape moves back to the right. This movement of the rivet tape 22 causes the first empty hole 70 (and subsequent empty holes) of the rivet tape 22 to be drawn through the inductive ring sensor 44 and to travel back again. Consequently, a signal indicative that no rivet is present will be periodically generated from the first sensor 44 during rivet insertion. A control system 72 receives an output signal from the inductive ring sensor 44. When the control system 72 receives an output signal which indicates that empty holes at the end of the rivet tape have been reached, the control system may trigger a rivet tape switching process.

The rivet tape switching process involves securing the rivet tape 22 using the moveable pin 48. When the control system 72 has determined that empty holes at the end of the rivet tape 22 have been reached, operation of the rivet insertion tool is suspended. Because the rivet insertion tool 30 is at its non-rivet insertion position it has not pulled the rivet tape 22 downwards, and a portion of the rivet tape has been wound back onto the spool via the spring-loading of the reel. The rivet tape 22 may therefore have a position such as that depicted in FIG. 8A in which rivets are present within the inductive sensor 44 and are present above the moveable pin 48.

Pressurised air is provided at the inlet 64 of the chamber 62, thereby pushing the rod 58, tube 65 and moveable pin 48 towards the rivet tape 22. As depicted in FIG. 8B, the moveable pin engages against a rivet 23 and is pushed into the tube 65. The tube 65 bears against a the rivet tape 22 (not visible in FIG. 8B but visible in FIG. 8D) and is prevented from moving upwards any further. The helical spring 61 is compressed and biases the moveable pin 48 against the rivet 23. The force exerted by the movable pin 48 is not sufficient to push the rivet 23 out of the rivet tape 22.

Figure 8C:
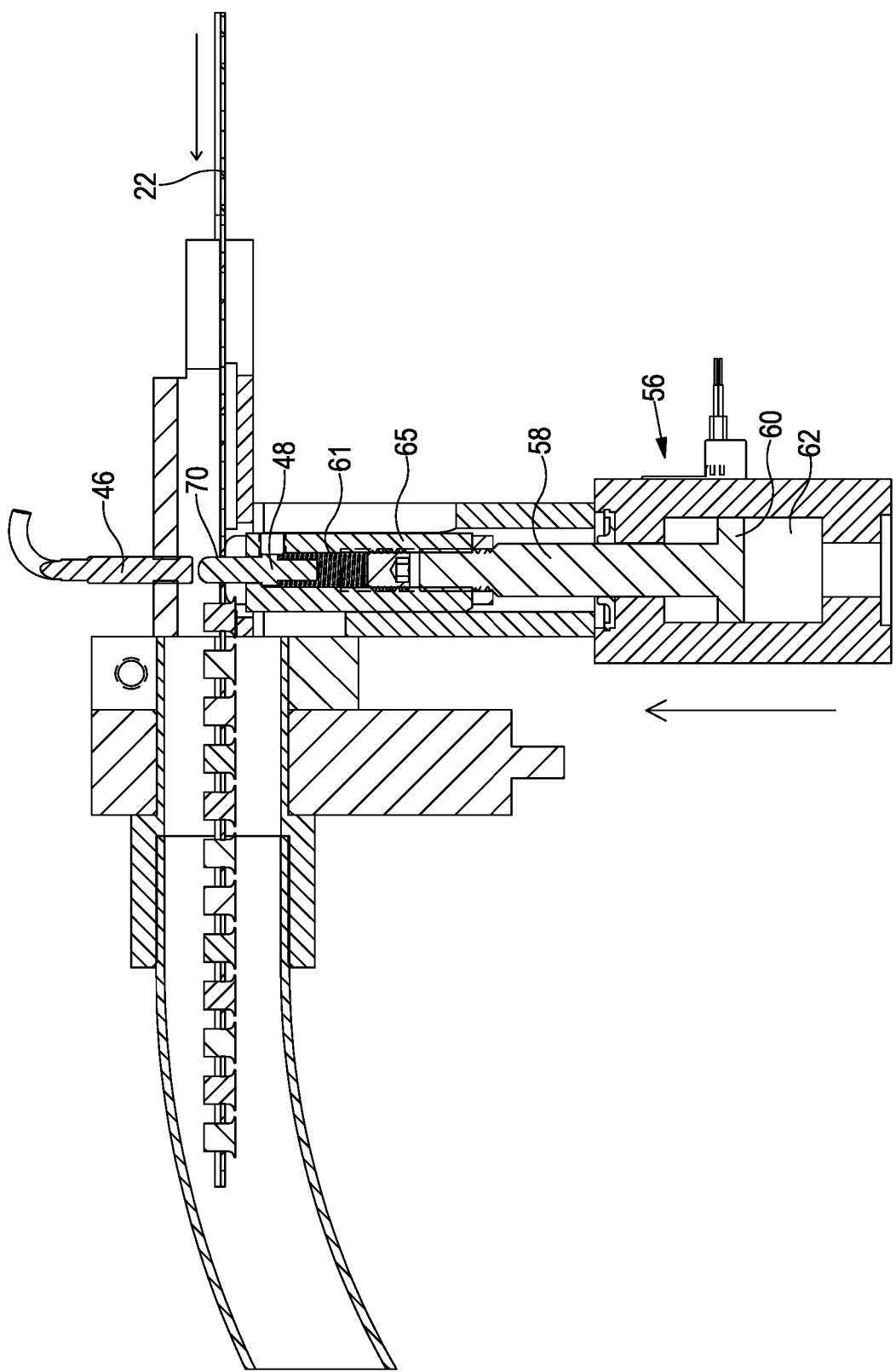
Figure 8D:
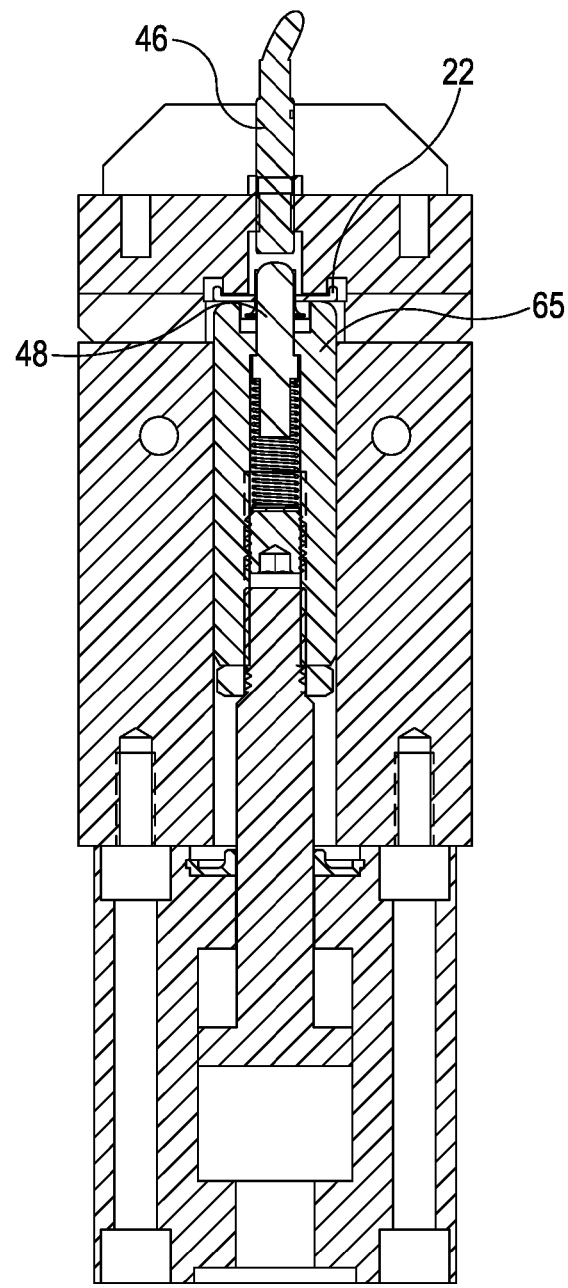

Once moveable pin 48 has been moved into position, the actuator of the rivet insertion tool 30 is moved downwards, thereby drawing the rivet tape 22 into the tube 36. This downward movement may be slower than the downward movement which occurs during rivet insertion by the rivet insertion tool 30. An end surface of the moveable pin 48 rides over the rivet 23, then over the rivet tape 22, then over the next rivet, etc. The movable pin 48 has a rounded end surface to promote smooth movement of the movable pin across heads of the rivets. When the first empty hole 70 of the rivet tape 22 passes over the moveable pin 48, the bias provided by the helical spring 61 pushes the moveable pin into the empty hole. This is depicted in FIGS. 8C and 8D. A sensor 46, which may for example be an inductive proximity sensor, senses the presence of the moveable pin 48 when the moveable pin has passed into the empty hole 70 of the rivet tape 22. The sensor 46 provides an output signal indicating that an empty hole has been reached, whereupon the control system 72 stops movement of the rivet insertion tool. The movable pin 48 is held in position through the hole 70 in the rivet tape 22 by the pneumatic actuator 56. The rivet tape 22 is held securely by the moveable pin 48 in the position depicted in FIG. 8C such that the rivet tape cannot move. The rivet tape 22 is ready to be connected to a new rivet tape using the clip 2 described further above.

The rivet tape securing apparatus 40 is depicted in perspective view in FIG. 10 together with a rivet tape cutting apparatus 100 (described further below). The rivet tape securing apparatus 40 has a distal end 41. The distal end includes a first side portion 242a configured to support one edge of the rivet tape 22 and a second side portion 242b configured to support an opposite edge of the rivet tape. A channel 243 located between the side portions 242a,b accommodates an unsupported central portion of the rivet tape 22. An L-shaped channel runs along an inner wall of each side portion 242a,b. Each L-shaped channel is configured to receive an edge of the rivet tape 22, including receiving a ridge which runs along the edge of the rivet tape. The distal end 41 of the rivet tape securing apparatus 40 is also provided with two holes 241a,b which are configured to receive upwardly projecting figures of a rivet tape joining apparatus 200 (described further below).

Figure 9C:
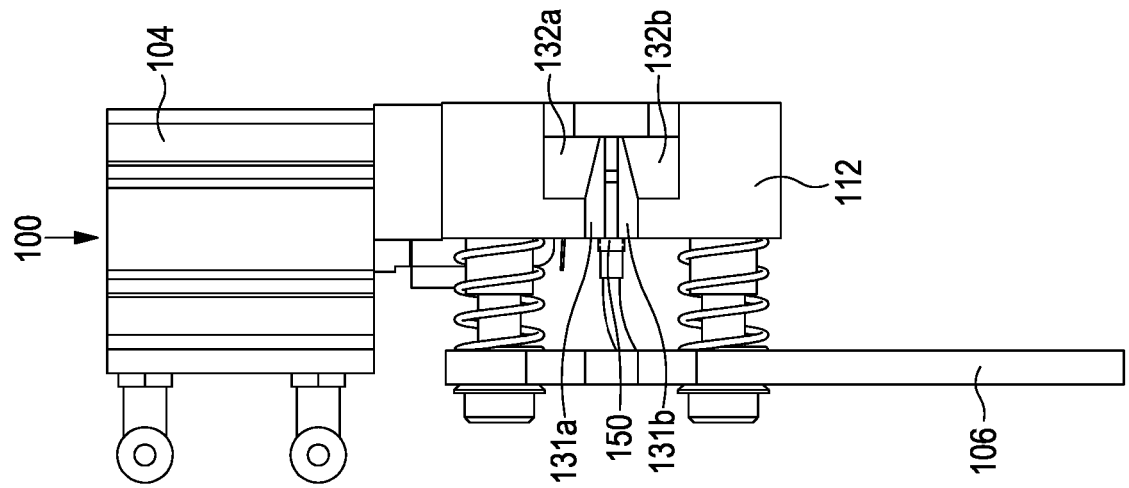
FIGS. 9A-C depict a rivet tape cutting apparatus.
Figure 9A:
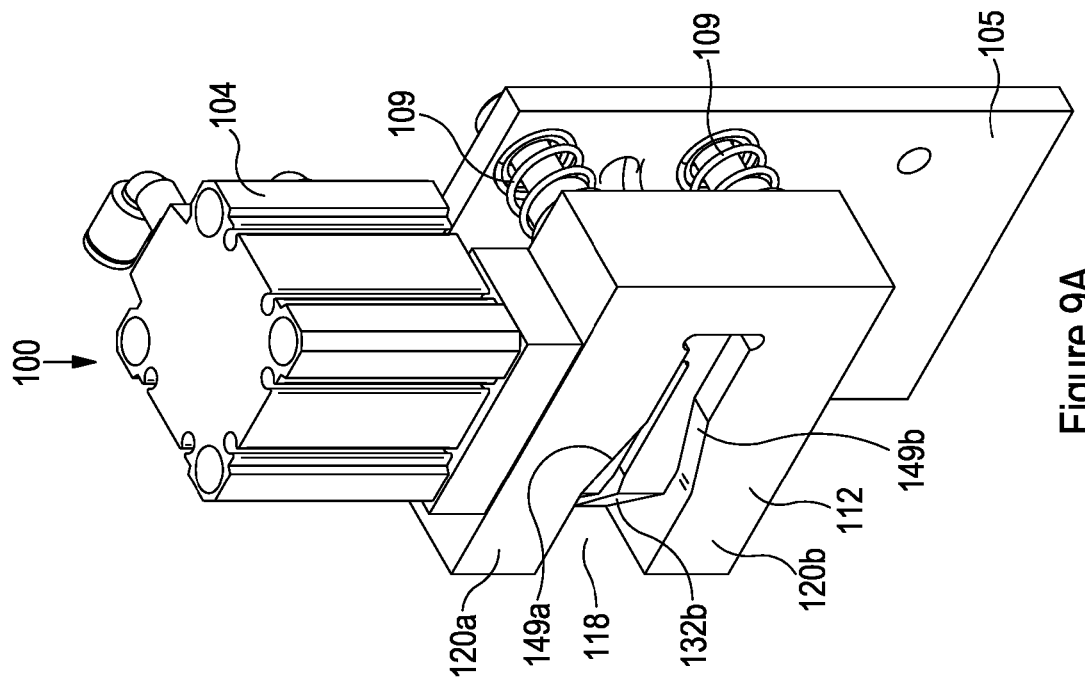
Figure 9B:
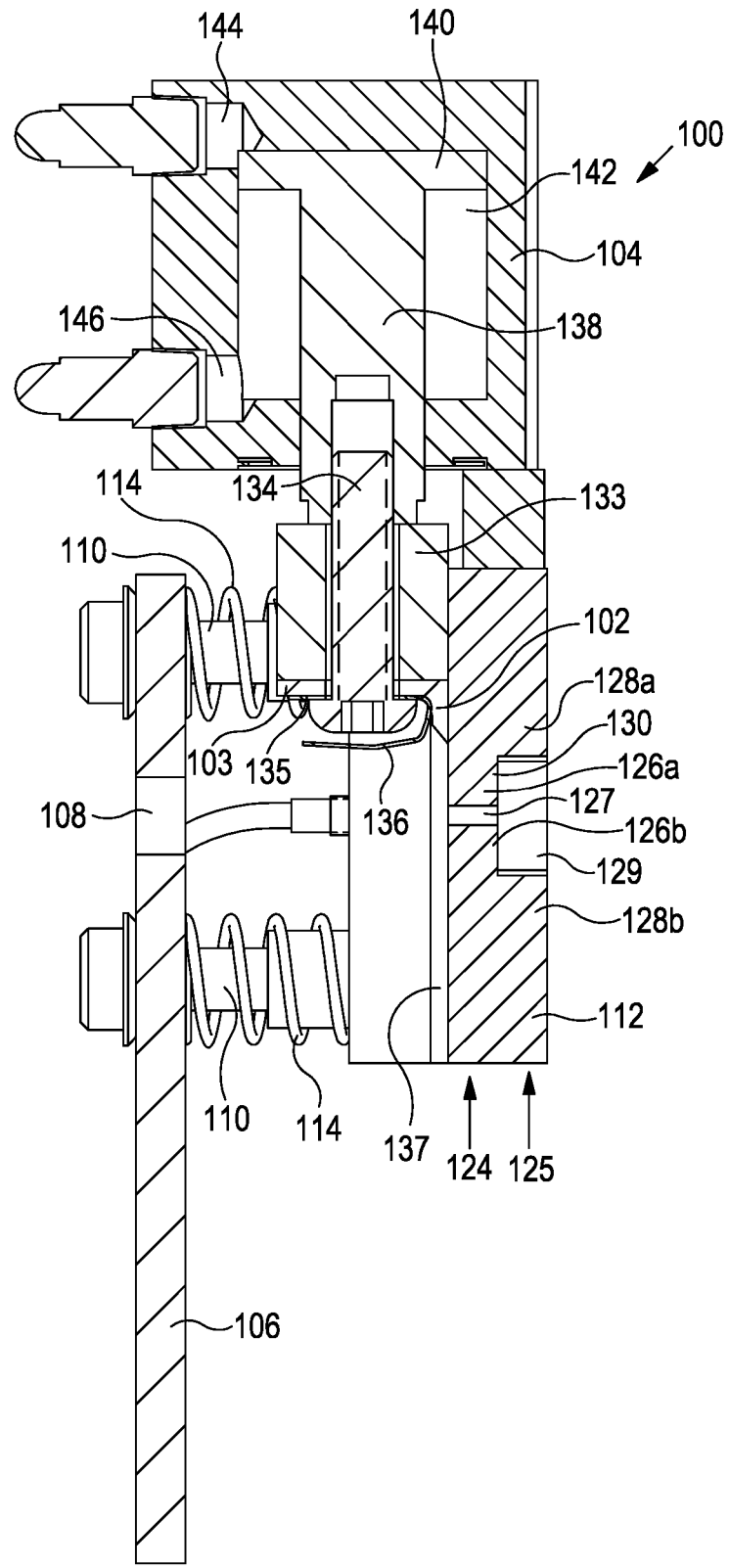

FIG. 9 depicts a rivet tape cutting apparatus 100 which may be used to cut the rivet tape 22. The rivet tape cutting apparatus 100 is depicted in perspective view in FIG. 9A, in cross-section in FIG. 9B and viewed from one end in FIG.

9C. FIG. 10 depicts the rivet tape cutting apparatus 100 in perspective view and the rivet tape securing apparatus 40 in combination.

The rivet tape cutting apparatus comprises a blade 102 which is operated by a pneumatic actuator 104, the pneumatic actuator being arranged to drive the blade through rivet tape 22 when desired and thereby cut the rivet tape. Although the actuator in this embodiment is pneumatic, in other embodiments some other form of actuator may be used (e.g. an electric actuator).

The rivet tape cutting apparatus 100 is supported by a stand 106, only part of which is shown. The stand 106 may for example be fixed to a floor of a factory or other location in which the rivet setting tool 30 is used. The stand 106 includes a slot 108 which is configured to receive the rivet tape 22 as described further below. The stand 106 includes four holes 109 through which bolts 110 extend. Distal ends of the bolts 110 are secured in a block 112 which forms part of the rivet tape cutting apparatus. Helical springs 114 are provided around each bolt 110 and resiliently bias the block 112 away from the stand 106. The bolts 110 are not fixed to the stand 106 and can thus move into and out of the holes in the stand. The resilient bias provided by the helical springs 114 pushes the block 112 away from the stand 106 such that heads 116 of the bolts 114 press against the stand 106. In this way, the block 112 is biased towards a desired position which is spaced away from the stand 106, but has some freedom to move as needed if a force acts against the block.

The block 112 is generally U-shaped with an opening 118 at one end. The block 112 may be considered to have the form of a pair of jaws 120a,b with an opening or gap 118 between the jaws. As best seen when viewed in cross-section in FIG. 9B, the jaws 120a,b comprise an inner portion 124 and an outer portion 125. The inner portion 124 is on a side of the block 112 which is closest to the blade 102, and the outer portion 125 is on a side of the block which is furthest from the blade (the outer portion is on an outer side of the block). The inner portion 124 of the block 112 comprises inner jaw portions 126a,b which FIG. 12B extend towards each other but are separated by a gap 127 (which may be referred to as the inner gap 127). The outer portion 125 of the block 112 comprises outer jaw portions 128a,b which extend towards each other but are separated by a gap 129. This gap, which may be referred to as the outer gap 129 is larger than the inner gap 127. Each outer jaw portion 128a,b is connected to a respective inner jaw portion 126a,b by a step 130.

Figure 10:
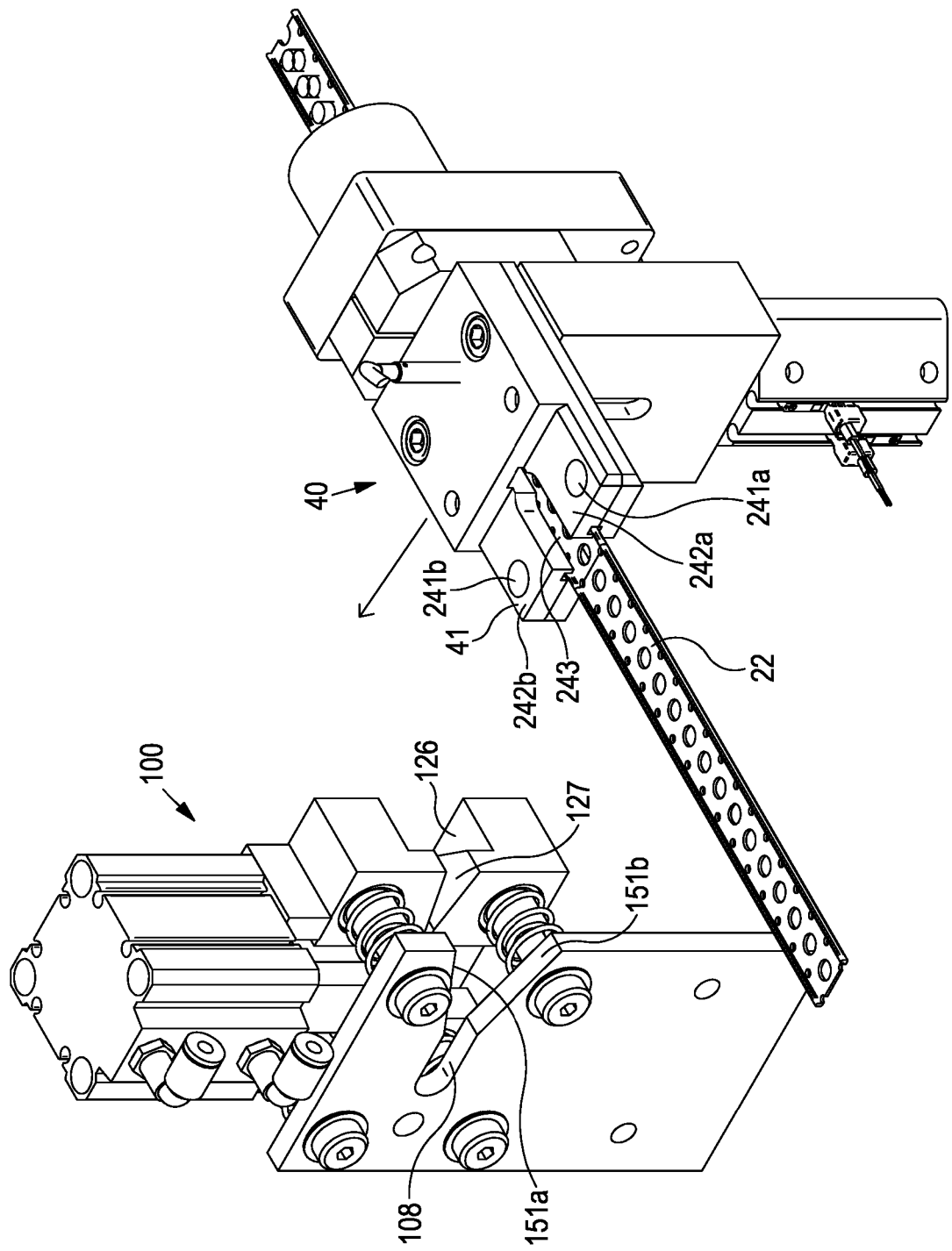
FIG. 10 depicts the rivet tape securing apparatus and the rivet tape cutting apparatus together with the rivet tape.

As may be best seen in FIG. 9C and FIG. 10, the inner gap 127 is widest at an outer end. The inner jaw portions 126a,b include faces 131a,b which taper inwardly to a narrower portion of the inner gap 127. The inwardly tapering faces 131a,b at the outer end of the inner gap 127 increase a range of positions over which the rivet tape 22 can be captured. The rivet tape, once captured, is guided by the inwardly tapering faces 131a,b to the narrower portion of the inner gap 127 for cutting.

The inner jaw portions 126a,b also include outwardly tapering side faces 132a,b. These faces taper outwardly towards the outer jaw portions 128a,b. The outwardly tapering side faces 132a,b may also assist in guiding a distal end of the rivet tape securing apparatus towards the outer gap 129.

As may be best seen in FIG. 9A, the outer gap 129 is widest at an outer end. The outer jaw portions 128a,b include faces 149a,b which taper inwardly to a narrower portion of the outer gap 129. The inwardly tapering faces 149a,b are located part way along the outer gap 129, such that an outer portion of the outer gap 129 is wider than an inner portion of the outer gap 129. This configuration of the outer gap 129 increases a range of positions over which a distal end of the rivet tape securing apparatus 40 can be captured. The rivet tape securing apparatus 40, once captured, is guided by the inwardly tapering faces 149a,b to the narrower portion of the outer gap 129.

The blade 102 is secured to a mounting block 133 by a bolt 134 which passes through a flange 103 which extends from the blade. A washer 135 is positioned between the bolt 134 and the flange 103. The washer 135 is provided with a leaf spring 136 which extends around and beneath a head of the bolt 134. The mounting block 133 includes a ridge (not visible) which is received in and guided by a groove 137 in the block 112.

The mounting block 133 is fixed to a rod 138 which extends from a piston 140 in a chamber 142 of a pneumatic actuator 104. A source of pressurised air (not depicted) is connected to a first inlet 144 of the chamber 142. A second source of pressurised air (not depicted) is connected to a second inlet 146 of the chamber 142 on an opposite side of the piston 140 from the first inlet 144.

A sensor 150 (e.g. an inductive sensor) is connected at an inward end of the inner gap 126. The sensor 150 is configured to provide an output signal when rivet tape securing apparatus 40 is held in the outer gap 129.

Operation of the rivet tape cutting apparatus 100 in combination with the rivet tape securing apparatus 40 will now be described with reference to FIGS. 10 and 11.

The rivet tape securing apparatus 40 together with the rivet tape 22 and the rivet insertion tool (not depicted) are moved by the robot arm (also not depicted) towards the rivet tape cutting apparatus 100, as depicted in FIG. 10. Although a tube extends from the rivet tape securing apparatus 40, for ease of illustration this tube is not depicted in FIG. 10. As described further above, the rivet tape 22 is held in place in the rivet tape securing apparatus 40 by engagement of the movable finger 48 through a hole 70 in the rivet tape.

Figure 11B:
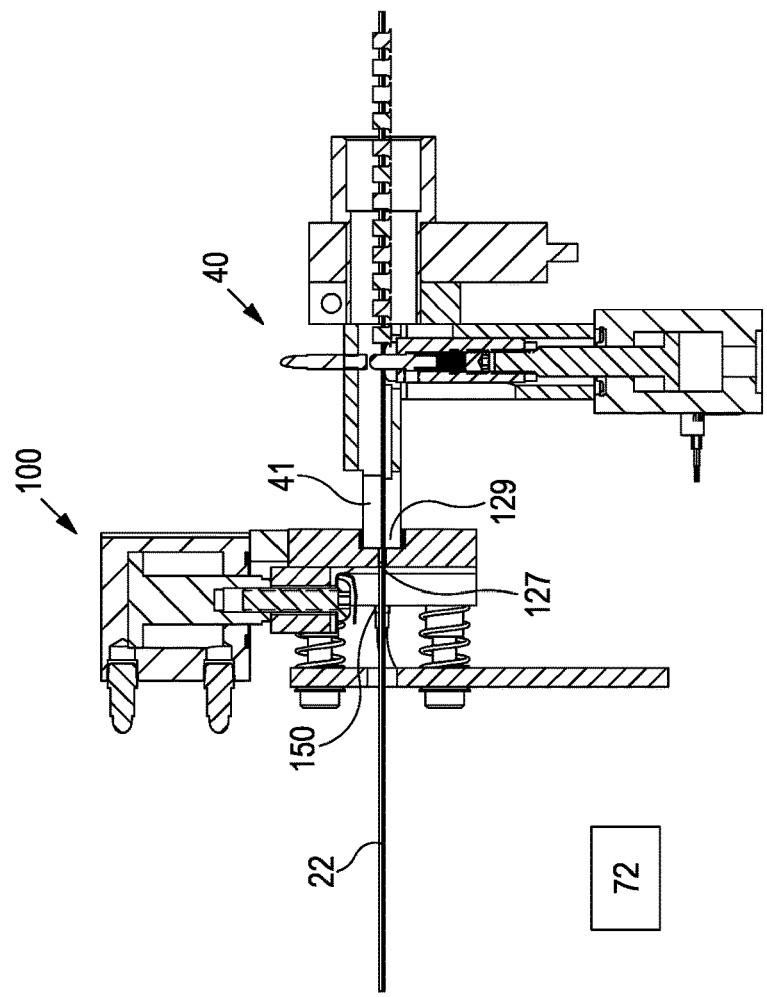
FIGS. 11A-C depict operation of the rivet tape cutting apparatus.
Figure 11A:
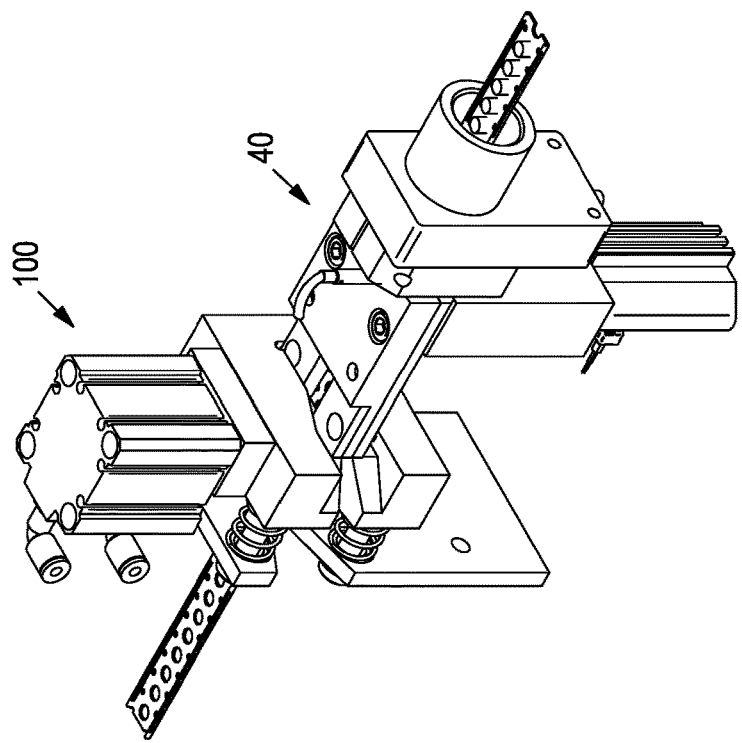

The robot arm moves the rivet tape securing apparatus 40 such that a distal end 41 of the rivet tape securing apparatus passes into the outer gap 129 of the rivet tape cutting apparatus 100. At the same time, the rivet tape 22 passes into the inner gap 127 of the rivet tape cutting apparatus. This is depicted in FIG. 11. FIG. 11A is a perspective view of the rivet tape securing apparatus 40, the rivet tape 22 and the rivet tape cutting apparatus 100. FIG. 11B is a cross-sectional view of the rivet tape securing apparatus 40, the rivet tape 22 and the rivet tape cutting apparatus 100.

If there is some misalignment between the rivet tape securing apparatus 40 and the outer gap 129, then the tapering faces 123a,b, 149a,b of the outer gap still allow the rivet tape securing apparatus 40 to be captured by the outer gap 129. The freedom of movement of the block 112 of the rivet tape cutting apparatus 100, which is provided by the bolts 110 and the helical springs 114, allows the block 112 to passively adjust its position to accommodate misalignment of the rivet tape securing apparatus 40. The tapering faces 123a,b, 149a,b of the outer gap 129 guide the distal end 41 of the rivet tape securing apparatus 40 to a desired position at an inner end of the outer gap 129.

The sloping faces 131a,b of the inner gap 127 allow the rivet tape 22 to be captured even if the rivet tape is not flat (e.g. bending upwards or downwards), and guided into an inner portion of the inner gap 127. Similarly, sloping faces 151a,b provided in the slot 108 in the stand 106 allow the rivet tape 22 to be captured and guided into an inner portion of the slot even if the rivet tape is not flat.

As may be seen from FIG. 11B, the distal end 41 of the rivet tape securing apparatus 40 has a height which corresponds with the size of the outer gap 129, and thus the rivet tape securing apparatus fits snugly into the outer gap. The rivet tape 22 is slightly thinner than the size of the inner gap 127 and thus is able to enter the inner gap 127 easily. The sensor 150 senses the presence of the rivet tape securing apparatus in the outer gap 129 and sends a signal to the control system 72 accordingly. The rivet tape 22 is in a closely controlled position in the rivet tape cutting apparatus 100 and is ready to be cut.

Figure 11C:
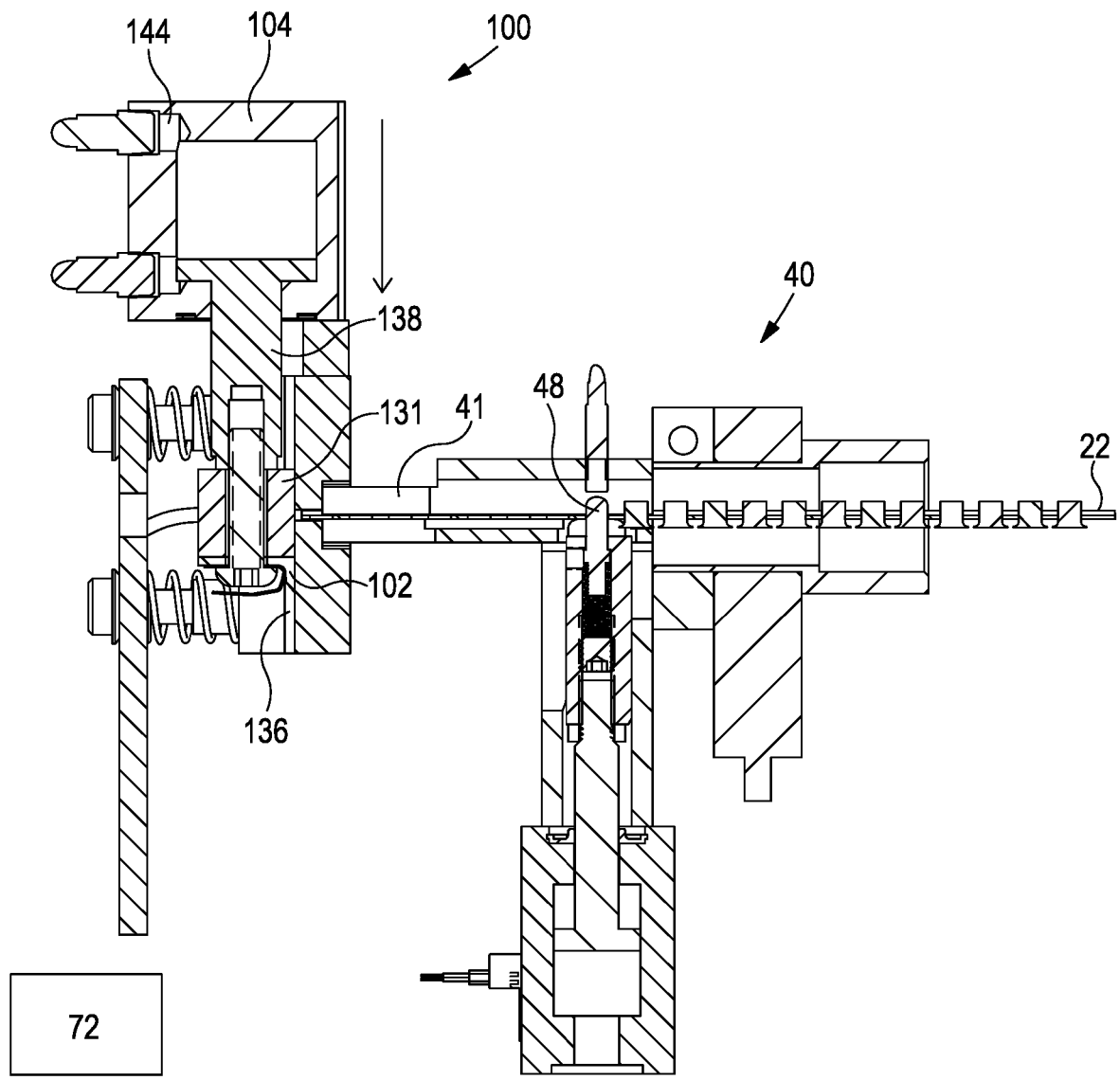

FIG. 11C depicts in cross section the rivet tape securing apparatus 40, the rivet tape 22 and the rivet tape cutting apparatus 100 during operation of the rivet tape cutting apparatus. The control system 72 sends a signal which causes pressurized air to be provided through the first inlet 144 of the pneumatic actuator 104. The pressurized air pushes the piston 140 downwards, as indicated by the arrow. As may be seen from FIG. 11C, the rod 138, mounting block 131 and blade 102 also move downwards. The downward movement of the mounting block 131 is guided by the groove 136. The blade 102 acts as a guillotine which cuts through the rivet tape 22. The rivet tape which has been cut away is not depicted in FIG. 11C. Following cutting of the rivet tape, the rivet tape 22 has a free end with a closely controlled length that extends from the movable finger 48. The free end of the rivet tape 22 projects beyond the distal end 41 of the rivet tape securing apparatus 40.

Once the rivet tape 22 has been cut, the reel (not depicted) which holds a remainder of the rivet tape can be removed (e.g. using an automated arm or other automated system).

After the rivet tape 22 has been cut, the rivet tape securing apparatus 40, rivet tape, and rivet insertion tool 30 may be moved by the robot arm (not depicted) to a rivet tape joining apparatus 200. In an alternative approach the robot arm does not move, and instead a rivet tape joining apparatus 200 is moved to the rivet tape securing apparatus.

The rivet tape joining apparatus 200 is depicted in FIG. 12. FIG. 12 depicts the rivet tape joining apparatus 200 in perspective view (FIG. 12A), viewed from above (FIG. 12B), viewed from one side (FIG. 12C) and viewed in cross-section (FIG. 12D). FIG. 12 also depicts the rivet tape securing apparatus 40, the cut rivet tape 22 (hereafter referred to as the old rivet tape 22) and a new rivet tape (hereafter referred to as the new rivet tape 26).

The rivet tape joining apparatus 200 is provided on a stand 202. The stand 202 may be connected to the stand 106 upon which the rivet tape cutting apparatus 100 is held. The stand may be secured to a floor of a factory or other environment in which the rivet insertion tool and robot arm are located.

A pneumatic actuator 204 extends upwardly from the stand 202. A bracket 206 is connected to the pneumatic actuator 204. A tape and clip holding block 208 is fixed to a distal end of the bracket 206. Guide rods 203 are located either side of the pneumatic actuator 204. Uppermost ends of the guide rods 203 are fixed to the bracket 206 and lowermost ends of the guide rods pass through the stand 202. The guide rods 203 also pass through an intermediate member 209 which is located between the stand 202 and the bracket 206. The intermediate member 209 forms an upper end of a pneumatic chamber of the pneumatic actuator 204. The guide rods 203 help to keep the bracket 206 correctly positioned when it is moved upwards by the pneumatic actuator 204.

Figure 12A:
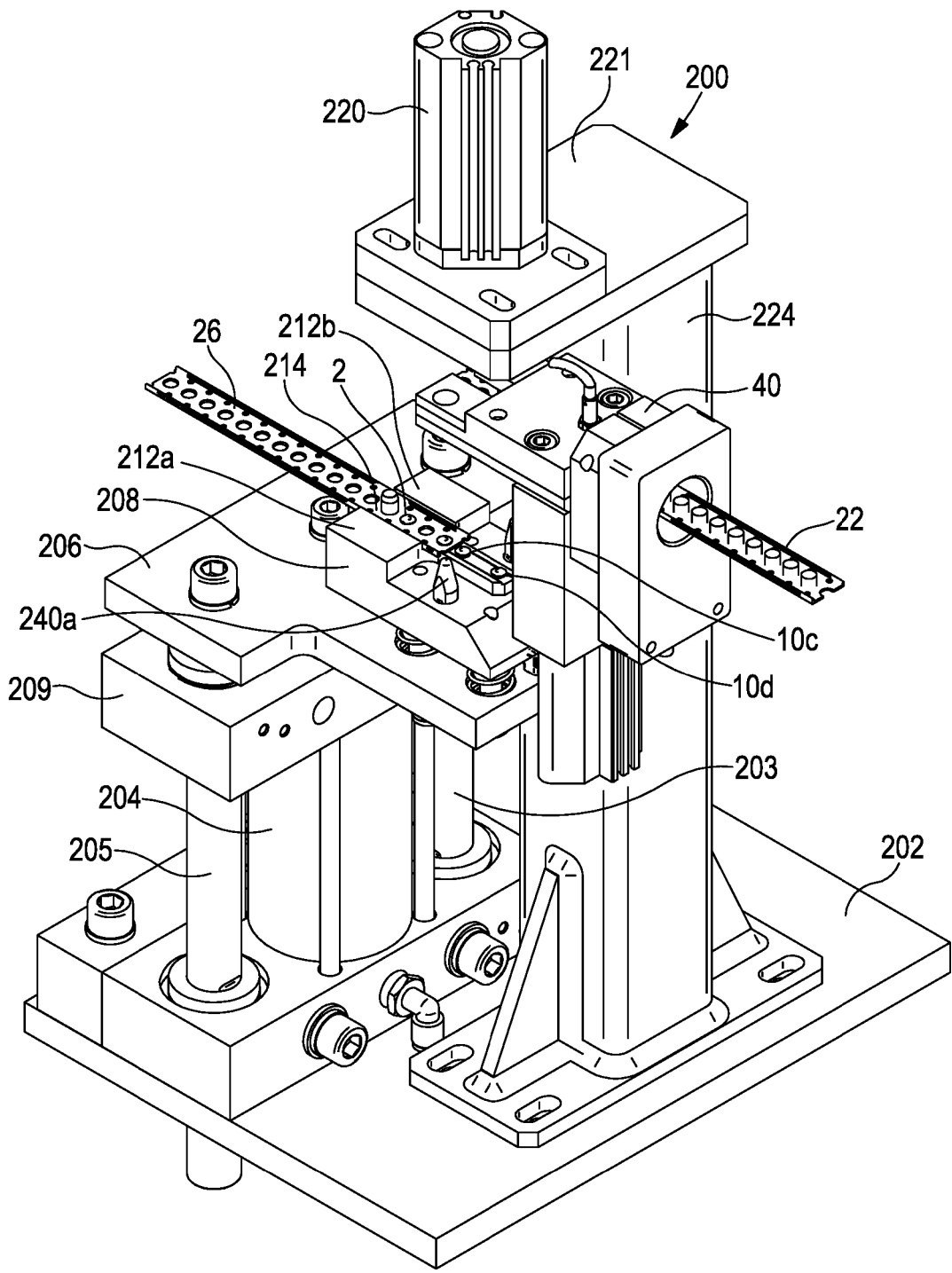
FIGS. 12A-D depict a rivet tape joining apparatus together with the rivet tape securing apparatus, first and second rivet tapes and the clip.
Figure 12B:
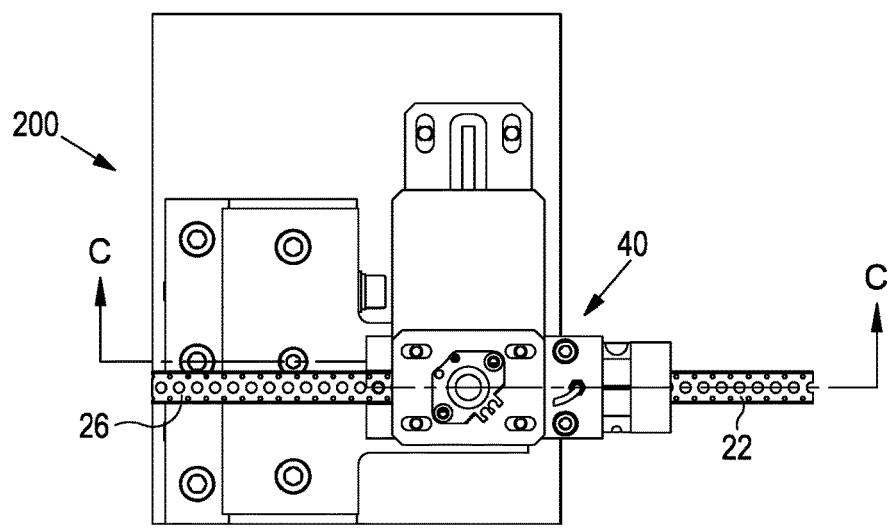
Figure 12C:
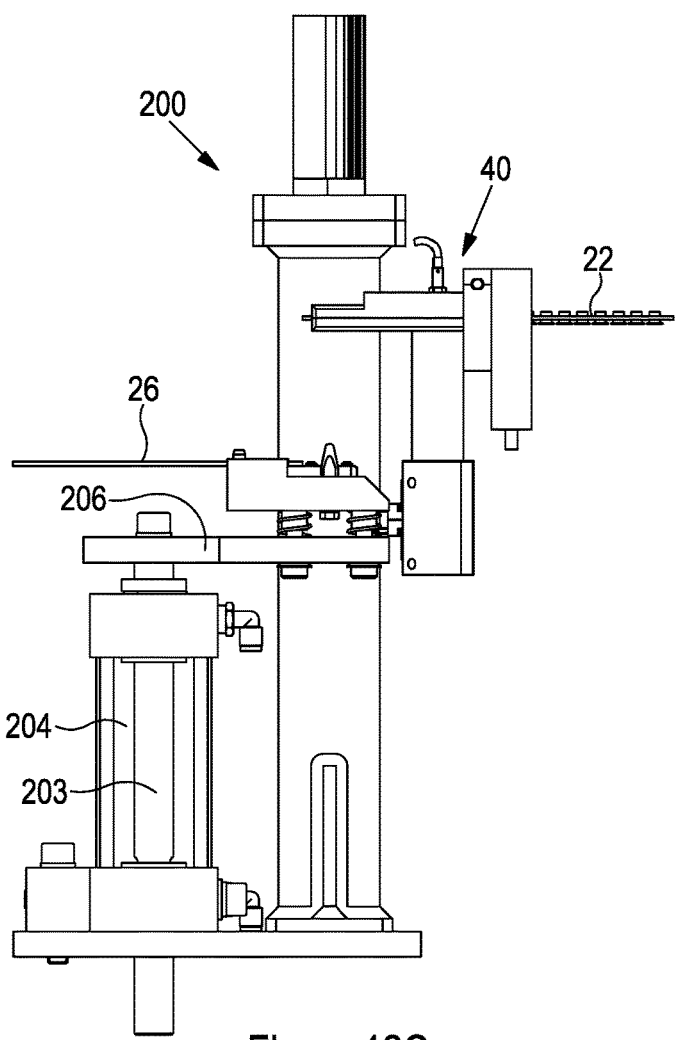
Figure 12D:
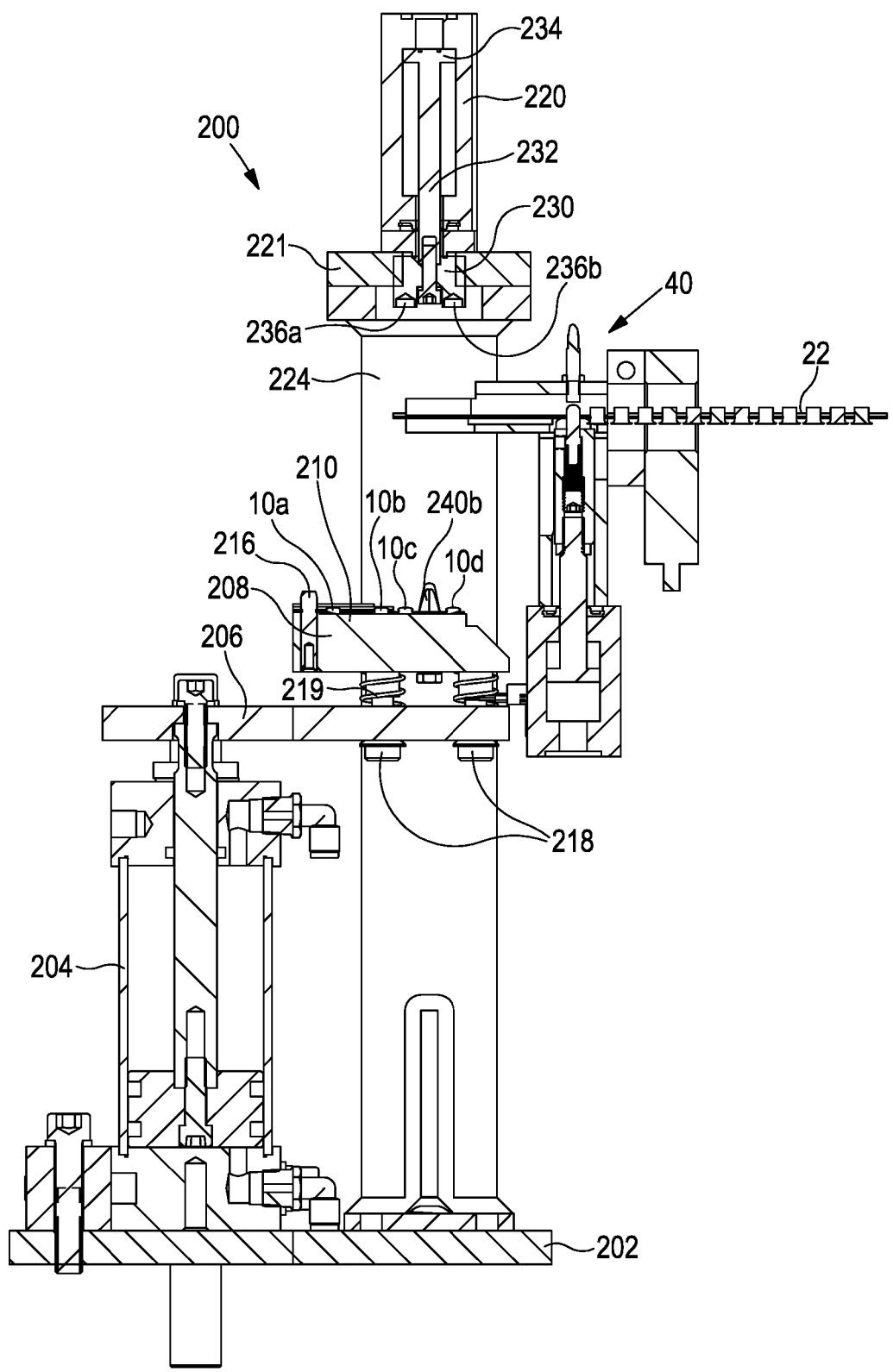

The new rivet tape 26 and the clip 2 are held by the tape and clip holding block 208, as may be most easily seen in FIG. 12A. The new rivet tape 26 and the clip 2 may be manually placed onto the tape and clip holding block 208. Projections 10c,d of the clip 2 extend upwardly when the clip 2 is held in the tape and clip holding block 208.

The tape and clip holding block 208 comprises a body 210 which includes upon its upper surface two raised portions 212a,b. The raised portions 212a,b are separated from each other such that they define a channel 214 which extends between them. The channel 214 has a width which corresponds with the width of the new rivet tape 26. A finger 216 projects upwardly from the body 210 and passes through a hole in the new rivet tape 26. In this embodiment the hole is the first empty hole beyond the end of the clip 2, but in other embodiments a different hole may be used. The finger 216 ensures that the new rivet tape 26 and the clip 2 remain in place on the rivet tape joining apparatus 200. The finger 216 fits snugly into the hole in the new rivet tape 26 and thereby holds the new rivet tape securely.

The body 210 of the tape and clip holding block 208 is connected to the bracket 206 by four bolts 218. Helical springs 220 are provided around each bolt 218 and extend between the bracket 206 and the tape and clip holding block 208. The helical springs 220 bias the tape and clip holding block 208 away from the bracket 206. The bolts 218 are free to move within holes in the bracket 206. The tape and clip holding block 208 is capable of some movement relative to the bracket 206, but this movement is limited by the bolts 218.

The rivet tape joining apparatus 200 further comprises a second pneumatic actuator 220 which is located above the tape and clip holding block 208. The second pneumatic actuator 220 is connected to a source of pressurized air (not depicted). The second pneumatic actuator 220 is held on a bracket 221 which extends from a post 224. The post 224 extends upwardly from the stand 202. The bracket 221 extends laterally from the post 224 such that the pneumatic actuator 220 is located directly above the body 210 of the tape and clip holding block 208. A block 230 is connected to a rod 232 which extends from a piston 234 of the second pneumatic actuator 220. The block 230, which is referred to hereafter as the pressing block 230, has a lowermost surface which includes first and second recesses 236a,b. The first and second recesses 236a,b have a separation which corresponds with the separation between the first and second projections 10a,b of the clip 2. In other embodiments the pressing block may be provided with other recesses which correspond with projections of other clips.

The tape and clip holding block 208 includes upwardly projecting first and second tapered fingers 240a,b. The first and second tapered fingers 240a,b are configured to be received in holes 241a,b provided at the distal end of the rivet tape securing apparatus 40 (see FIG. 10). The pressing block 230 is sufficiently narrow that it can enter a gap 242 at the distal end 41 of the rivet tape securing apparatus 40.

Figure 14A:
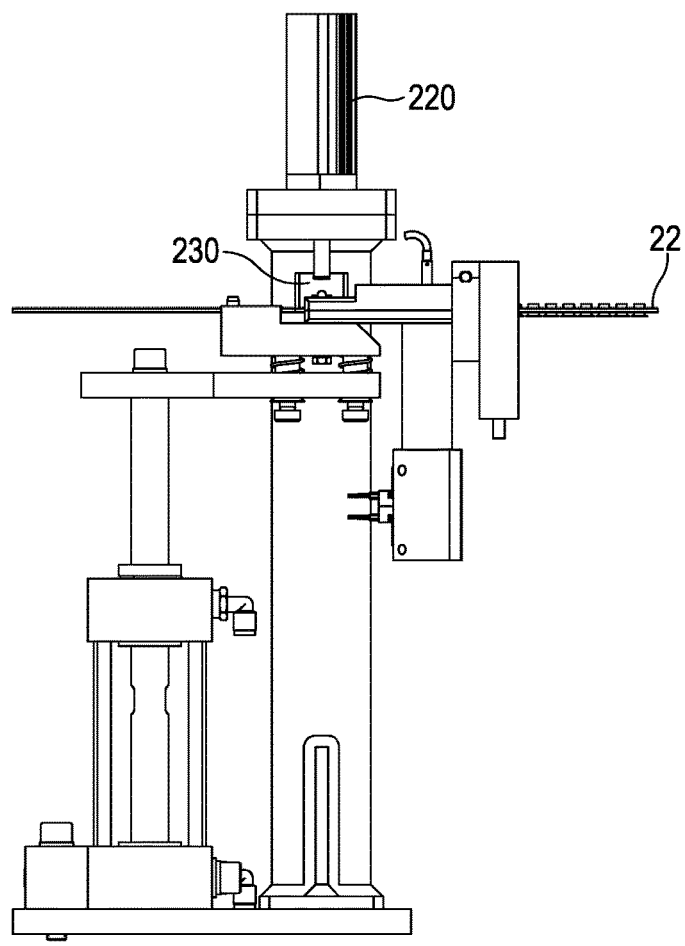
FIG. 14A-C depict operation of the rivet tape joining apparatus.
Figure 14B:
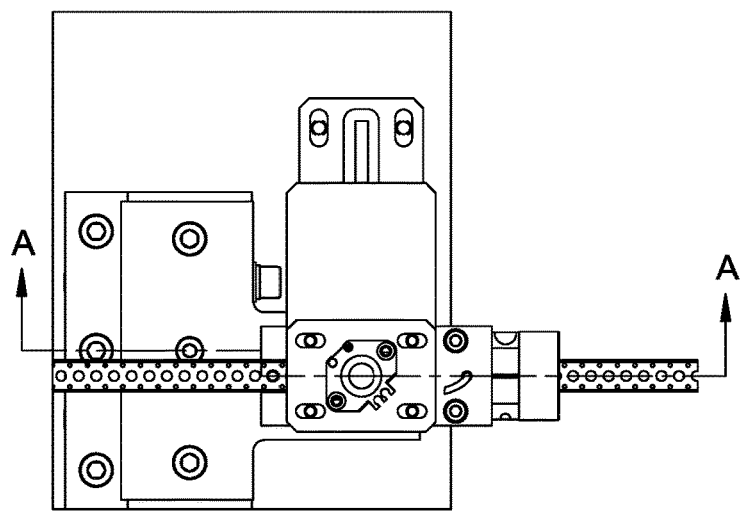
Figure 14C:
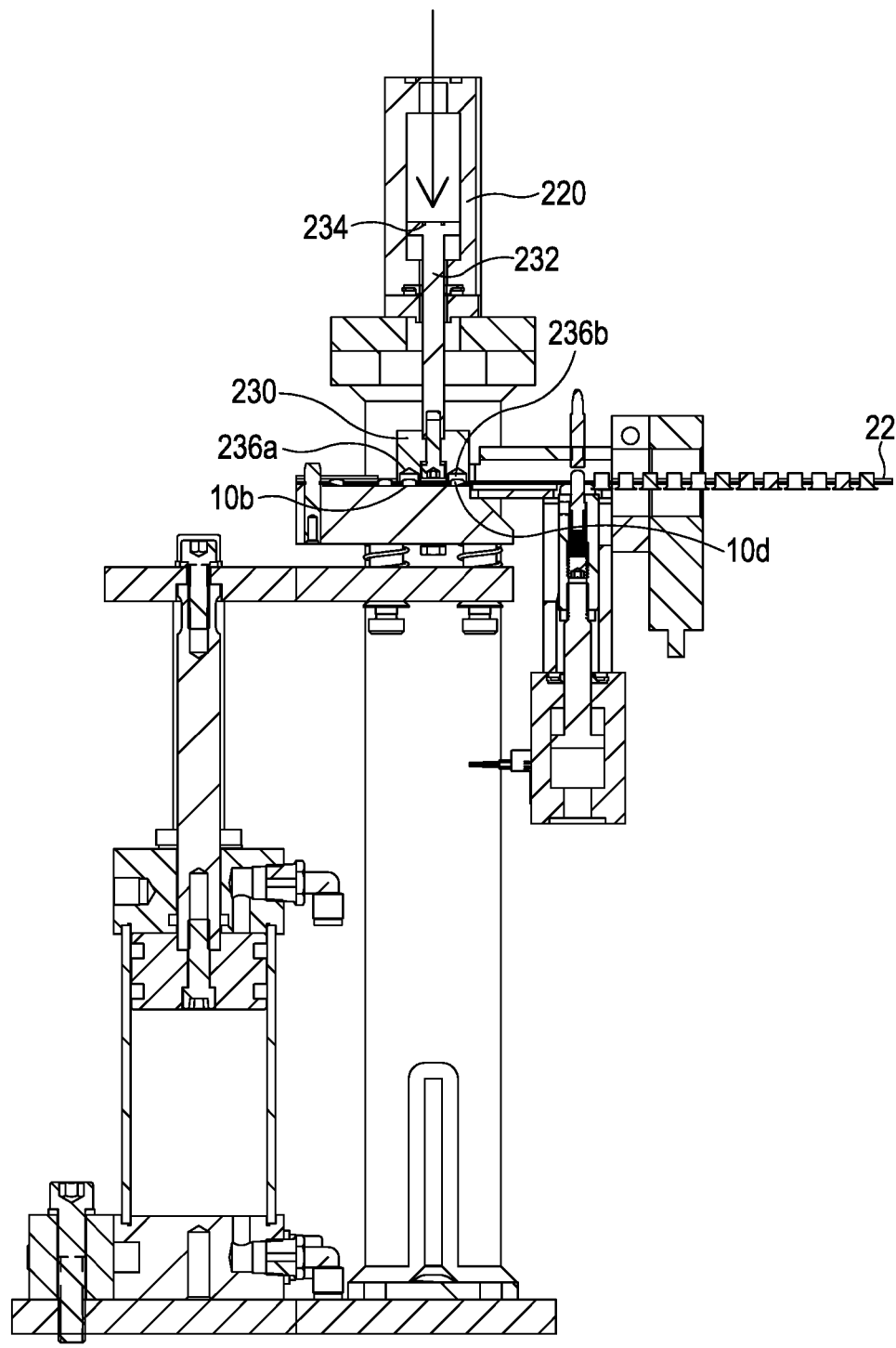

Operation of the rivet tape joining apparatus 200 will now be described with reference to FIGS. 12 to 14. FIG. 13 depicts the rivet tape joining apparatus 200 from one side (FIG. 13A), from above (FIG. 13B), and in cross-section (FIG. 13C). FIG. 14 depicts the rivet tape joining apparatus 200 from one side (FIG. 14A), from above (FIG. 14B), and in cross-section (FIG. 14C). Referring first to FIG. 12, the new rivet tape 26 and clip 2 are manually engaged onto the tape and clip holding block 208. The rivet tape holding apparatus 40 and old rivet tape 22 are moved such that the loose end of the old rivet tape 22 is between the pressing block 230 and the tape and clip holding block 208. Referring to FIG. 13, pressurized air is supplied to the first pneumatic actuator 204, pushing the piston 205 upwards. This moves the rod 207 and bracket 206 upwards and also moves the tape and clip holding block 208 upwards. The new rivet tape 26 and clip 2 move upwards with the tape and clip holding block 208. At the end of the movement of the piston 205, the body 210 of the tape and clip holding block 208 engages against the distal end 41 of the rivet tape securing apparatus 40. The old rivet tape 22 sits on top of the clip 2 with first and third holes of the old rivet tape being aligned with first and second projections 10a,b of the clip. The old rivet tape 22 is thus ready to be engaged onto the clip 2.

Referring to FIG. 14, pressurized air is now supplied to the second pneumatic actuator 220. This drives the piston 234, rod 232 and pressing block 230 downwards. The pressing block 230 passes into the gap 242 at the distal end 41 of the rivet tape securing apparatus 40 and presses against the old rivet tape 22. The pressing block 230 pushes the old rivet tape 22 downwards such that the holes of the old rivet tape 22 expand around the projections 10a,b of the clip 2. The projections 10a,b themselves are not pressed by the pressing block 230 but instead enter the recesses 236a,b provided in the pressing block. Thus, the pressing block 230 pushes against the old rivet tape 22 such that it passes over the projections 10a,b of the clip 2, and the projections thereby engage into the old rivet tape. The pressing block 230 is then retracted using the second pneumatic actuator 220. The old rivet tape 22 and the new rivet tape 26 have thus been joined together using the clip 2.

A reel (not depicted) which holds the new rivet tape 26 may be mounted onto the robot arm (e.g. using an automated arm or other automated system).

The rivet insertion tool 30 and rivet tape securing apparatus 40 are moved away from the rivet tape joining apparatus 200 using a robot arm (not depicted). The rivet insertion tool and rivet tape securing apparatus are moved towards a location at which rivets are to be inserted into a workpiece (not depicted). The movable pin 48 is retracted to allow the motor 38 to once again draw the old rivet tape 22 through the nose 32 of the rivet insertion tool 30. Insertion of rivets into workpieces using the rivet insertion tool 30 is then recommenced. When the last rivet of the old rivet tape 22 has been inserted into the workpiece, the motor 38 draws the clip 2 and the new rivet tape 26 through the nose of the rivet insertion tool 30 as described further above. Insertion of rivets into the workpiece from the new rivet tape 26 then takes place.

As will be appreciated from the above, a new rivet tape 26 may be joined to an old rivet tape 22 in an entirely automated manner. This is advantageous because it allows a supply of rivets to a rivet insertion tool to be replenished without an operator having to move into the immediate vicinity of the rivet setting tool (thereby avoiding the need to deactivate all of the rivet setting tools in the controlled environment in which that rivet setting tool is located).

Figure 15A:
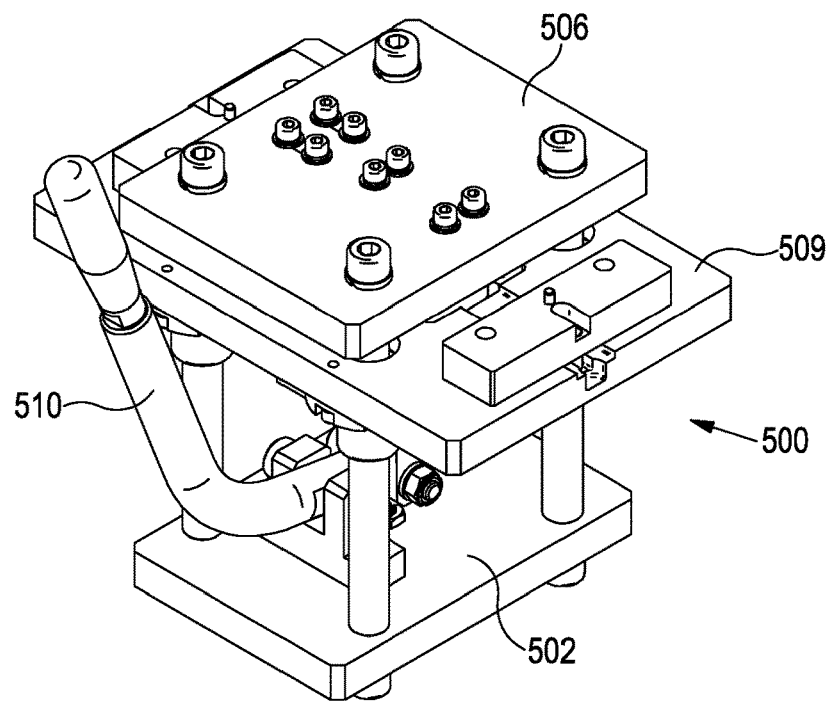
FIGS. 15-17 depict a rivet tape cutting apparatus according to an alternative embodiment of the invention.
Figure 15B:
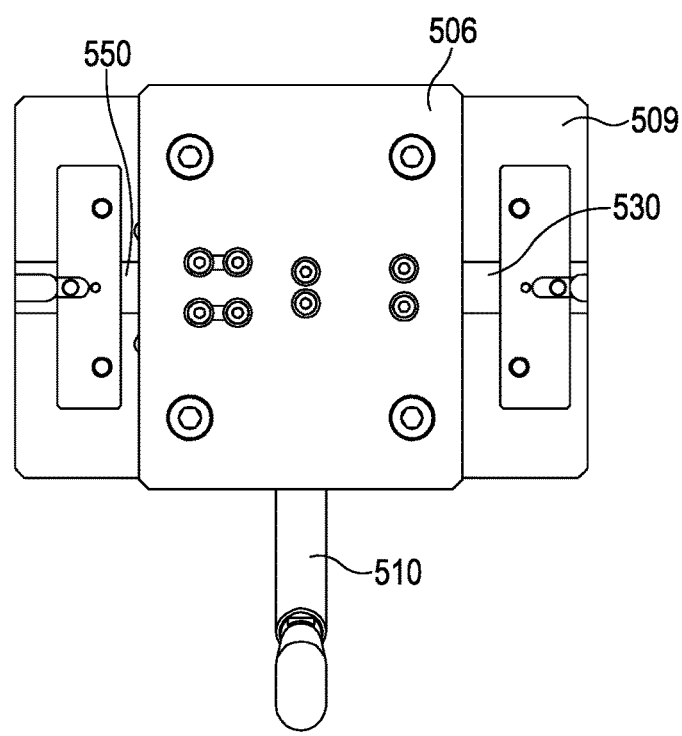
Figure 16A:
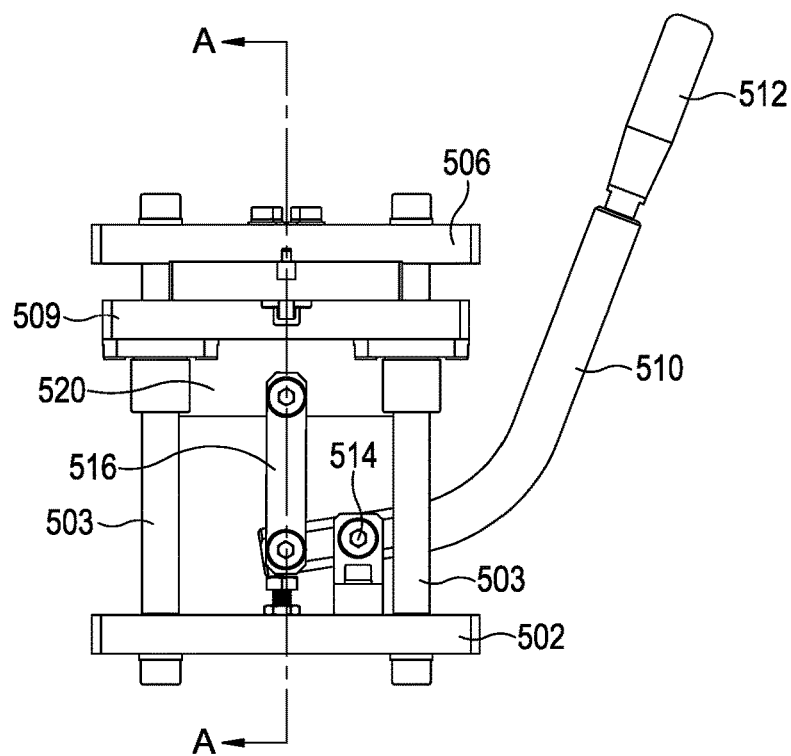
Figure 16B:
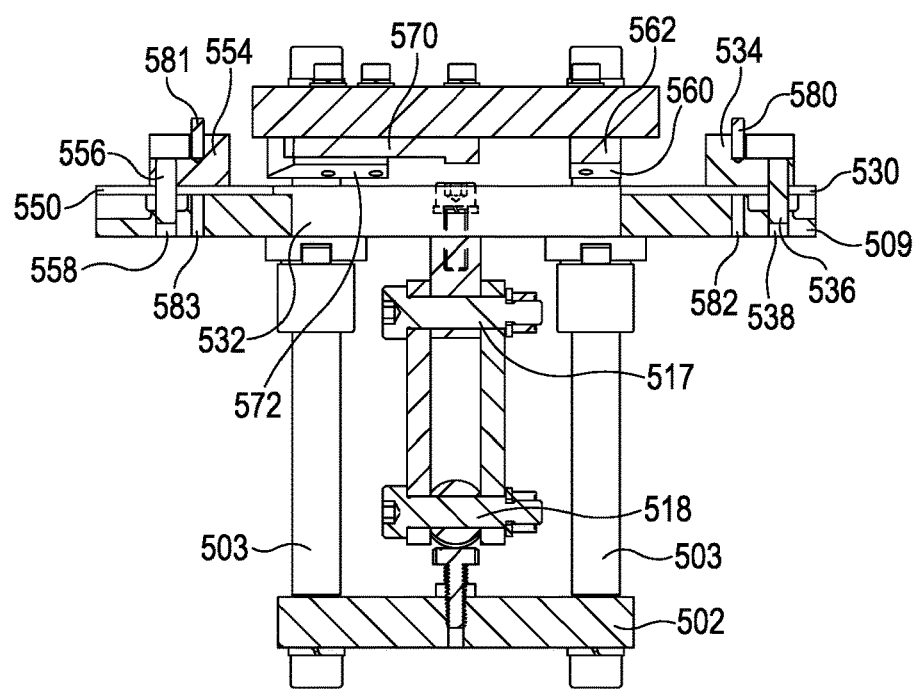
Figure 17A:
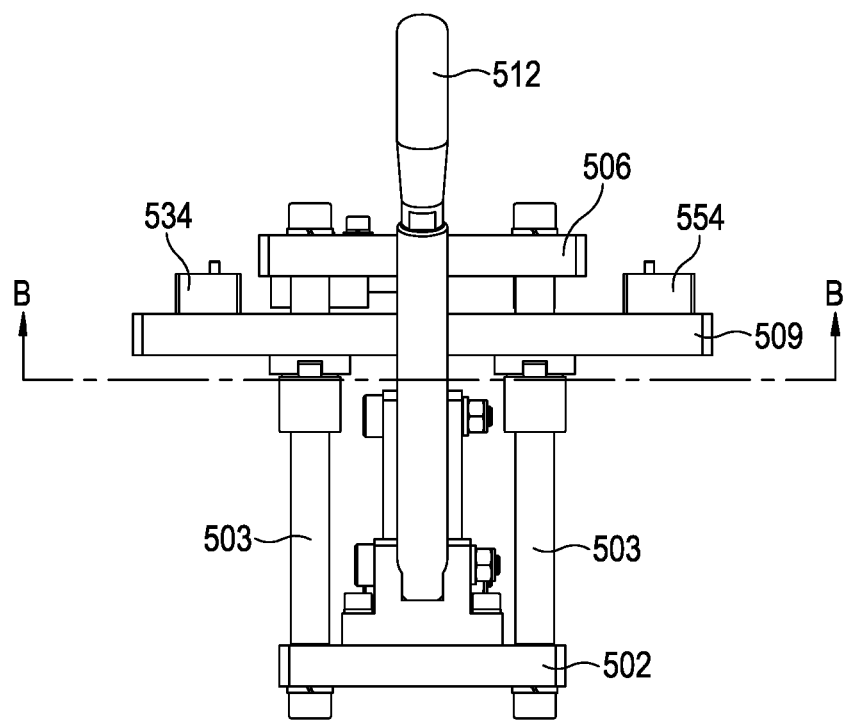
Figure 17B:
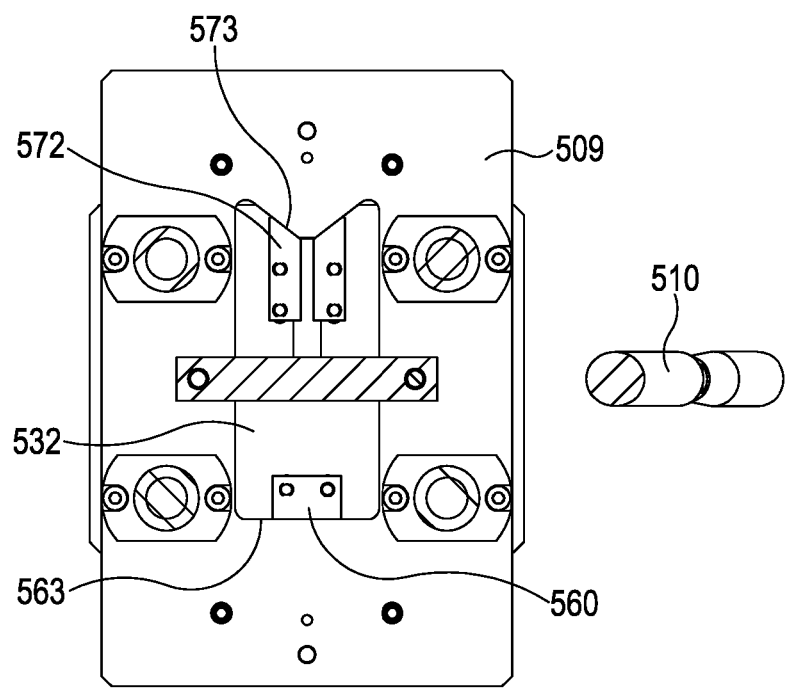

A rivet tape cutting apparatus according to an alternative embodiment of the invention is depicted in FIGS. 15-17. FIG. 15A is a perspective view of the tape cutting apparatus 500, and FIG. 15B depicts the tape cutting apparatus viewed from above. FIG. 16A depicts the tape cutting apparatus viewed from one side and FIG. 16B depicts the tape cutting apparatus viewed in a first cross-section. FIG. 17A depicts the tape cutting apparatus 500 viewed from a different side and FIG. 17B depicts the tape cutting apparatus viewed in a second cross section.

The tape cutting apparatus 500 comprises a stand 502. The stand 502 may be placed any convenient location, for example secured on a work bench of a factory or tape processing facility. The location in which the tape cutting apparatus 500 is provided may be outside of a controlled environment in which rivet insertion tools are operated. For example, the tape cutting apparatus may be located away from a production line. This allows a technician to cut partially used rivet tapes, and then connect them together using a clip, without risk of injury.

Guide rods 503 extend upwardly from the stand 502 and support an upper plate 506. A manually operated actuator 504 supports a moveable plate 509. The moveable plate is positioned between the stand 502 and the upper plate 506. The guide rods 503 extend through the moveable plate 509. In the depicted embodiment four guide rods are provided, and these are located adjacent to corners of the stand 502. However in other embodiments a different number of guide rods may be provided, and the guide rods may have a different arrangement. Providing four guide rods 503 is advantageous because this allows for a straightforward arrangement of guide rods which provide strong support to the upper plate 506 and which provide accurate guiding of the moveable plate 509.

The actuator 504 comprises an arm 510 which extends from one side of the apparatus and is provided with a grip 512 at a distal end. The arm 510 is connected to a pivot 514 (e.g. a pin) about which the arm 510 rotates when actuated. A proximal end of the arm 510 is connected to a linkage 516 by a pivot 517 (e.g. a pin). A further pivot 518 (e.g. a pin) connects an upper end of the linkage to a bracket 520 which extends downwardly from the movable plate 509. Operation of the arm 510 is thus converted to upwards and downwards movement of the movable plate 509 (guided by the guide rods 503).

The movable plate 509 is provided with two tape holders. The first tape holder comprises a recess 530 which extends along a right hand portion of the tape cutting apparatus (as viewed from above in FIG. 15B). Referring to FIGS. 16B and 17B, an opening 532 is provided in the movable plate 509. The tape receiving recess 530 extends from an outer edge of the movable plate 509 to the opening 532. A tape securing block 534 extends transversely across the recess 530. A peg 536 extends downwardly from the tape securing block 534 into a bore 538 in the movable plate 509. Additional pegs either side of the tape receiving recess 530 extend from the block 534 into the movable plate 509. In use, the tape securing block 534 is removed and a rivet tape (not depicted) is received in the recess 530. The rivet tape extends partway into the opening 532. The tape securing block is then positioned such that the peg 536 of the tape securing block 534 passes through a hole in the rivet tape and then passes into the bore 538. This secures the rivet tape in place.

An opposite side of the movable plate is similarly provided with a tape receiving block 554 which extends transversely across a tape receiving recess 550. A peg 556 extends into a bore 558 in the movable plate 509. Additional pegs 559 extend between the tape securing block and the movable plate 509. Again, rivet tape is received in the recess 550 and projects into the opening 532. The peg 556 passes through a hole in the rivet tape and into the bore 558. This secures the tape in place in the tape cutting apparatus 500.

The upper plate 506 is fixed to the guide rods 503 and does not move. A first blade 560 is held by a mount (e.g. a block) which extends downwardly from the fixed upper plate 506. The blade 560 has a straight cutting edge which extends transverse to the direction of the tape receiving recess 530 (and thus transverse to tape held by the recess). The first blade 560 is aligned with a first edge 563 of the opening 532 in the movable plate 509. Consequently, when the movable plate 509 moves upwards the first blade 560 cuts into the rivet tape held in the first recess 530 with a guillotine-like action. This provides a straight cut across the rivet tape.

A second mount 570 extends downwardly from the fixed upper plate 506. The second mount supports an arrangement of three blade portions which is configured to provide a three-sided cut on the rivet tape, for example as depicted in FIG. 4D and FIG. 5C. In some embodiments a single compound blade with three sides may be provided. In other embodiments the three blade portions may comprise three different blades. In general, the blade portions may be shaped to provide a non-square cut such that the cut tape does not have 90° corners. For ease of terminology herein, the blade portions on this side of the tape cutting apparatus are referred to as the second blade 572. The second blade 572 is aligned with edges 573 of the opening 532 in the movable plate 509. Consequently, when the movable plate 509 moves upwards the second blade 572 cuts into the rivet tape held in the second recess 550 with a guillotine-like action. This provides a three-sided cut across the rivet tape (or other non-square cut).

In use, rivet tapes are secured in the first and second tape receiving recesses 530, 550 and project into the opening 532 as explained further above. The handle 512 is actuated, thereby pushing the movable plate 509 upwards. The first and second blades 560, 572 simultaneously cut through the rivet tapes.

As explained further above in connection with FIGS. 4D and 5C, the location at which a rivet tape is cut, determined relative to the position of the last hole in the tape, may be selected to provide the rivet tape with particular properties such as desired strength. In particular, the position at which a rivet tape is cut determines the length of the land in front of the first hole (or behind the final hole) of the rivet tape. For example, the land in front of the final hole of a rivet tape which is provided with a three-sided cut may be longer than the land of a rivet tape which is provided with a straight cut (which may be referred to as a square cut). The tape cutting apparatus of FIGS. 15-17 allows the positions of cuts through the tape to be made accurately and consistently because the separation between the peg 536 and the first blade 560 is fixed. The separation between the peg 556 and the second blade 572 is also fixed. This makes it simple and easy for an operator to cut rivet tapes in an optimal manner such that the tapes may be joined using clips described elsewhere herein and such that the tapes will perform correctly when they are fed into a rivet insertion tool.

Various modifications may be made to the tape cutting apparatus of FIGS. 15-17. For example, in other embodiments the upper plate may be movable with the middle plate being fixed. The form of actuator is not necessarily a mechanical arm and linkage. Any form of actuator may be used. The moveable plate may be replaced for example with a frame or other tape supporting structure. Preferably the tape supporting structure is sufficiently rigid that the positions of the blades with respect to the pegs and bores which hold the rivet tapes in place will not vary in an undesirable manner.

Although in the depicted embodiment the tapes are securing using blocks with pegs, any suitable tape securing apparatus may be used to secure the tapes.

The depicted embodiment cuts two rivet tapes at the same time. However, in other embodiments, two different tape cutting apparatuses may be used to cut rivet tapes. A first apparatus may provide the straight cut and the second apparatus may provide the three sided cut (or other non-straight cut).

The tape securing blocks 534, 554 may be inverted in order to secure rivet tape with 3 mm holes instead of rivet tape with 5 mm holes. When this is done, pegs 580, 581 which extend upwardly in the Figures now extend downwardly and are received in bores 582, 583. Again, the separation between the pegs 580, 581 with bores 582, 583 and the blades 560, 572 is such that cuts are formed in the rivet tapes at desired distances from holes in the rivet tapes.

In other embodiments the tape cutting apparatus may be configured to cut only 5 mm rivet tape or 3 mm rivet tape. Where this is the case, the positions of the pegs and holes of the tape securing blocks and the moveable plate 509 may be reversed (pegs provided in the plate and bores provided in the blocks). This is not done in the embodiment of the invention because providing pegs for the 3 mm rivet tape on the moveable plate 509 would prevent the apparatus being used for 5 mm rivet tape (and vice versa).

Supplying rivets using a spool of rivet tape is advantageous compared with supplying rivets loose because it allows stricter monitoring of the identity of rivets. When loose rivets are used, the loose rivets are poured out of a sealed bag into a bowl or hopper. A pneumatic blow feed is then used to transfer rivets from the bowl or hopper to a rivet insertion tool which sets the rivets into workpieces. A disadvantage of this loose rivet feed method is that there will be a mixture of rivets in the bowl or hopper. Rivets supplied in rivet bags are traceable back through rivet production steps via a batch code on the rivet bag. Once emptied into the bowl or hopper however, the rivet batches get mixed. Consequently, a riveted flange e.g. in a car could be riveted using more than one rivet batch. If there is a quality problem with the rivets, then this will result in a substantial maintenance exercise in which a rivet bowl or hopper, blow feed tube and rivet insertion tool magazine have to be emptied, before a known good batch of rivets can be used to restart production. Rivet tape does not suffer from this disadvantage. Every spool of rivet tape carries a batch number. An exchange of a spool means an exchange of batch numbers, with no rivets of an old batch number being left in the rivet system. Therefore, an operator can trace rivet batches to every car which is built.

In an embodiment, each spool of rivet tape may include an RFID tag (e.g. a programmable RFID tag, barcode or other identifier) which identifies that spool, including identifying the batch of rivets held on the spool. When a new spool is started, the identity of the spool may be logged by the control system 72 using the RFID tag, barcode or other identifier. Every riveted joint in the vehicle may have a unique number and every vehicle may also have a unique number. Therefore the control system 72 can record which rivet batch was used for each riveted joint of each vehicle. This provides full traceability of batch numbers being used for riveted joints throughout vehicle assembly (or other production). If a problem with a rivet batch is identified, the control system 72 can identify in real time which tools are using that rivet batch, thereby allowing production using those tools to be suspended until the rivet spools have been changed. Vehicle parts which have already been assembled using the rivet batch can also be identified. Thus, the number of parts which are assembled using a defective rivet batch can be reduced, and those parts which have already been assembled can be quickly identified and reworked. If a defective batch of rivets is identified some time after production of vehicles has been completed then the vehicles which have been assembled using the defective rivets can be identified and the defective rivets replaced as needed.

Rivet tape joining clips 2 may be provided with RFID tags (e.g. programmable RFID tags).

The term "rivet tape" as used in this description may be interpreted as meaning a tape along which a plurality of rivets is distributed. The rivets may for example be self-piercing rivets. The self-piercing rivets may have a shank diameter of 3 mm or 5 mm. The rivets may be tubular rivets. The rivets may be solid rivets.

Embodiments of the invention may be used to insert rivets into workpieces which form parts of vehicles (e.g. parts of the vehicle body). Thus, embodiments of the invention may be used to manufacture vehicles.

The invention claimed is:

1. A rivet tape joining clip comprising an elongate body provided with a plurality of projections which extend from one side of the elongate body, wherein the projections are provided with radially outward laterally projecting lips; wherein the elongate body comprises a central portion and side portions provided on either side of the central portion, and wherein the side portions are thicker than the central portion.

2. The rivet tape joining clip of claim 1, wherein the laterally projecting lips are located at distal ends of the projections.

3. The rivet tape joining clip of claim 1, wherein the elongate body is provided with two inner projections located towards a centre of the elongate body and two outer projections located towards ends of the elongate body.

4. The rivet tape joining clip of claim 3, wherein a separation between the outer projections and a respective inner projection is double a separation between the inner projections.

5. The rivet tape joining clip of claim 1, wherein the elongate body is provided with four or more projections.

6. The rivet tape joining clip of claim 1, wherein the clip includes a pair of projections with a separation that is smaller than the separation between other projections or is smaller than a multiple of the separation between other projections.

7. The rivet tape joining clip of claim 6, wherein the difference in separations correspond with stretching that occurs between the pair of projections when the clip is used.

8. The rivet tape joining clip of claim 6, wherein the difference in separations is up to around 2 mm.

9. The rivet tape joining clip of claim 6, wherein the difference in separations is around 1 mm.

10. The rivet tape joining clip of claim 6, wherein the clip is provided with four projections, an inner pair of projections being having a separation which is smaller than the separation between other projections.

11. The rivet tape joining clip of claim 6, wherein the clip is provided with six projections, an inner pair of projections being having a separation which is less than twice the separation between other projections.

12. The rivet tape joining clip of claim 1, wherein the projections are provided with a convex lowermost surface.

13. The rivet tape joining clip of claim 1, wherein the clip has a face at each end of the elongate body, and wherein each face tapers outwardly from an end point of the clip.

14. The rivet tape joining clip of claim 1, wherein the projections are generally cylindrical.

15. The rivet tape joining clip of claim 1, wherein the elongate body defines an elongate axis and a length that extends parallel to the elongate axis, and wherein the outer portions extend along a majority of the length of the elongate body.

16. The rivet tape joining clip of claim 1, wherein the elongate body is concave extending away from the plurality of projections.

17. A rivet tape joining clip comprising an elongate body provided with four or more generally cylindrical projections which extend from one side of the elongate body, wherein the projections are provided with laterally projecting lips; wherein the elongate body comprises a central portion and side portions provided on either side of the central portion, and wherein the side portions are thicker than the central portion.

18. A rivet tape joining clip engaged in first and second rivet tapes, the rivet tape joining clip comprises an elongate body provided with a plurality of projections which extend from one side of the elongate body, wherein the projections are provided with laterally projecting lips, wherein the elongate body comprises a central portion and side portions provided on either side of the central portion, and wherein the side portions are thicker than the central portion, and the first rivet tape defining first holes and the second rivet tape defining second holes, and wherein the plurality of projections of the rivet tape joining clip pass through a respective one of the first holes and one of the second holes of the first and second rivet tapes.

19. The rivet tape joining clip and first and second rivet tapes of claim 18, wherein lips of the projections are wider than the holes and thereby hold the rivet tape securely on the rivet tape joining clip.

20. The rivet tape joining clip and first and second rivet tapes of claim 18, wherein adhesive is provided between the rivet tape joining clip and the first and second rivet tapes.

21. The rivet tape joining clip and first and second rivet tapes of claim 18, wherein the separation between projections of the rivet tape joining clip is such that a regular separation between sprocket holes is maintained across the first and second rivet tapes.

22. The rivet tape joining clip and first and second rivet tapes of claim 21, wherein the regular separation between sprocket holes is maintained only during use, via stretching of the rivet tape joining clip.

23. A rivet tape joining clip engaged in first and second rivet tapes, the rivet tape joining clip comprises an elongate body provided with a plurality of projections which extend from one side of the elongate body, wherein the projections are provided with laterally projecting lips, wherein the elongate body comprises a central portion and side portions provided on either side of the central portion, and wherein the side portions are thicker than the central portion, the first rivet tape defines a plurality of first holes, the second rivet tape defines a plurality of second holes, wherein projections of the rivet tape joining clip pass through holes of the first tape but not through a final hole of the first tape, and wherein projections of the rivet tape joining clip pass through holes of the second tape including a first hole of the second tape.

24. The rivet tape joining clip and first and second rivet tapes of claim 23, wherein an end of the second tape is provided with a non-square cut.

25. The rivet tape joining clip and first and second rivet tapes of claim 23, wherein an end of the second tape is provided with a three-sided cut or a curved cut.

26. The rivet tape joining clip and first and second rivet tapes of claim 25, wherein a land behind a final hole of the first tape is shorter than a land in front of a first hole of the second tape.

27. The rivet tape joining clip and first and second rivet tapes of claim 23 wherein an end of the first tape is provided with a square cut.

28. A method comprising:
  providing a rivet tape joining clip having an elongate body including a plurality of projections extending from one side of the elongate body, the projections including radially outward laterally projecting lips, wherein the elongate body comprises a central portion and side portions provided on either side of the central portion, and wherein the side portions are thicker than the central portion;
  joining first and second rivet tapes together using the rivet tape joining clip; and
  using a riveting tool to insert rivets from the first and second tapes into workpieces.

29. The method of claim 28, wherein the workpieces form part of a vehicle.

\* \* \* \* \*